(12) United States Patent
Hsu et al.

(10) Patent No.: US 8,345,358 B2
(45) Date of Patent: Jan. 1, 2013

(54) IMAGE-CAPTURING OPTICAL LENS ASSEMBLY

(75) Inventors: Chih-Wen Hsu, Taichung (TW); Ming-Ta Chou, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 31 days.

(21) Appl. No.: 13/194,187

(22) Filed: Jul. 29, 2011

(65) Prior Publication Data

US 2012/0307382 A1   Dec. 6, 2012

(30) Foreign Application Priority Data

Jun. 1, 2011  (TW) .............................. 100119170 A

(51) Int. Cl.
*G02B 9/60* (2006.01)
(52) U.S. Cl. ........ 359/770; 359/740; 359/753; 359/763; 359/714
(58) Field of Classification Search .................. 359/740, 359/753, 763, 770
See application file for complete search history.

(56) References Cited

U.S. PATENT DOCUMENTS

| 6,906,872 B2 * | 6/2005 | Wang et al. ................... 359/753 |
| 7,446,955 B1 | 11/2008 | Noda |
| 2008/0144193 A1 * | 6/2008 | Adachi ......................... 359/770 |

* cited by examiner

*Primary Examiner* — Evelyn A. Lester
(74) *Attorney, Agent, or Firm* — Morris, Manning & Martin, LLP; Tim Tingkang Xia, Esq.

(57) ABSTRACT

The present invention provides an image-capturing optical lens assembly comprising, in order from an object side to an image side, a front lens group, a stop, and a rear lens group. The front lens group comprises, in order from the object side to the image side: a first lens element with negative refractive power having a convex object-side surface and a concave image-side surface; and a second lens element with positive refractive power having a convex object-side surface and a concave image-side surface. The rear lens group comprises, in order from the object side to the image side: a third lens element with positive refractive power having a convex object-side surface and a convex image-side surface; a fourth lens element with negative refractive power; and a fifth lens element with positive refractive power having a convex image-side surface. With such an arrangement of optical elements, the optical system will have a field of view that is large enough; meanwhile, aberrations of the optical system can be favorably corrected to obtain good image quality.

18 Claims, 16 Drawing Sheets

IMAGE-CAPTURING OPTICAL LENS ASSEMBLY

CROSS-REFERENCE TO RELATED APPLICATIONS

This non-provisional application claims priority under 35 U.S.C. §119(a) on Patent Application No. 100119170 filed in Taiwan, R.O.C. on Jun. 1, 2011, the entire contents of which are hereby incorporated by reference.

BACKGROUND OF THE INVENTION

1. Field of the Invention

The present invention relates to an image-capturing optical lens assembly, and more particularly, to a compact image-capturing optical lens assembly used in an electronic product.

2. Description of the Prior Art

In recent years, optical imaging lenses have been used in a wider range of products, and in particular, they are used in the following products for example: mobile phone cameras, webcams, vehicle cameras, security surveillance cameras and electronic game devices. The sensor of a general imaging lens is none other than CCD (Charge Coupled Device) or CMOS Sensor (Complementary Metal Oxide Semiconductor Sensor). Furthermore, as advances in semiconductor manufacturing technology have allowed the pixel size of sensors to be reduced and imaging lenses have become more compact with high resolution, there is an increasing demand for imaging lenses featuring better image quality.

Imaging lenses used in mobile phone cameras, webcams, vehicle cameras, security surveillance cameras or electronic game devices typically require a larger field of view to capture an image of a larger area at one time. Generally, a conventional imaging lens assembly with a large angle of view, such as the four-element lens assembly disclosed in U.S. Pat. No. 7,446,955, is arranged in such manner that the front lens group has negative refractive power and the rear lens group has positive refractive power, thereby forming an inverse telephoto structure to achieve a wide field of view. While such arrangement facilitates the enlargement of the field of view, the aberration correction of the optical system is ineffective due to the inclusion of only one lens element in the rear lens group. Moreover, vehicles equipped with rear-view cameras have become more and more common, and there is a trend toward high-resolution, wide-angle lenses for rear-view cameras. Therefore, a need exists in the art for a wide-angle imaging lens assembly, which has a wide field of view, high image quality and a moderate total track length.

SUMMARY OF THE INVENTION

The present invention provides an image-capturing optical lens assembly comprising, in order from an object side to an image side, a front lens group, an aperture stop, and a rear lens group. The front lens group comprises, in order from the object side to the image side: a first lens element with negative refractive power having a convex object-side surface and a concave image-side surface; and a second lens element with positive refractive power having a convex object-side surface and a concave image-side surface. The rear lens group comprises, in order from the object side to the image side: a third lens element with positive refractive power having a convex object-side surface and a convex image-side surface; a fourth lens element with negative refractive power; and a fifth lens element with positive refractive power having a convex image-side surface, wherein a central thickness of the fifth lens element is CT5, a focal length of the lens assembly is f, a curvature radius of the object-side surface of the first lens element is R1, a curvature radius of the image-side surface of the fifth lens element is R10, and they satisfy the following relations: $0<CT5/f<0.7$; $0<R1/f<5.5$; and $R10/f<-0.85$.

With such an arrangement of optical elements, the optical system will have a field of view that is large enough; meanwhile, aberrations of the optical system can be favorably corrected to obtain good image quality.

In an image-capturing optical lens assembly of the present invention, the first lens element with negative refractive power allows the field of view of the system to be favorably enlarged. The second lens element and the third lens element with negative refractive power provide the main refractive power of the system, allowing the total track length of the lens assembly to be favorably reduced; also, the second lens element and the third lens element effectively distribute the refractive power of the system, thereby favorably reducing the sensitivity of the lens assembly. The fourth lens element with negative refractive power allows the aberration produced by the third lens element with positive refractive power to be corrected, and moreover, astigmatisms of the system can be effectively corrected. The fifth lens element having positive refractive power acts as a correction lens that can correct the high-order aberration, and cooperates with the fourth lens element having negative refractive power to achieve telephoto effects; such an arrangement can help to shorten the back focal length and further to reduce the total track length of the lens assembly.

In the image-capturing optical lens assembly of the present invention, the first lens element with negative refractive power has a convex object-side surface and a concave image-side surface. With this configuration, the field of view of the system can be favorably enlarged, and the refraction of incident light is more moderate for preventing the aberration from being excessively large; therefore, it is favorable for obtaining a better balance between a wide field of view and aberration correction. As to the second lens element, it is a meniscus lens element having a convex object-side surface and a concave image-side surface; this configuration can help correct the astigmatism produced by the first lens element when the image-side surface of the first lens element is a concave surface with a higher curvature radius. The third lens element is a bi-convex lens element having convex object-side and image-side surfaces; with this configuration, the refractive power of the third lens element can be favorably distributed, thereby further reducing the total track length of the lens assembly and sensitivity of the system. The fifth lens element has a convex image-side surface; this configuration allows the angle at which light is projected onto the sensor from the off-axis field to be effectively reduced, thereby increasing the photosensitivity of the system.

In the image-capturing optical lens assembly of the present invention, the aperture stop is disposed between the front lens group and the rear lens group. In a wide-angle optical system, it is particularly needed to correct distortions and chromatic aberrations of magnification, and this can be done by placing the aperture stop at a position where the refractive power of the system is balanced. Therefore, the aperture stop is disposed between the front lens group and the rear lens group in the present invention. By doing so, the front lens group comprising at least two lens elements allows the system to have a sufficient field of view; meanwhile, the rear lens group comprising at least three lens elements allows aberrations of the system to be effectively reduced, thereby achieving a wide field of view and good image quality at the same time. Also, such an arrangement of the aperture stop can help reduce the sensitivity of the system.

DETAILED DESCRIPTION OF THE PREFERRED EMBODIMENTS

Figure 1A:
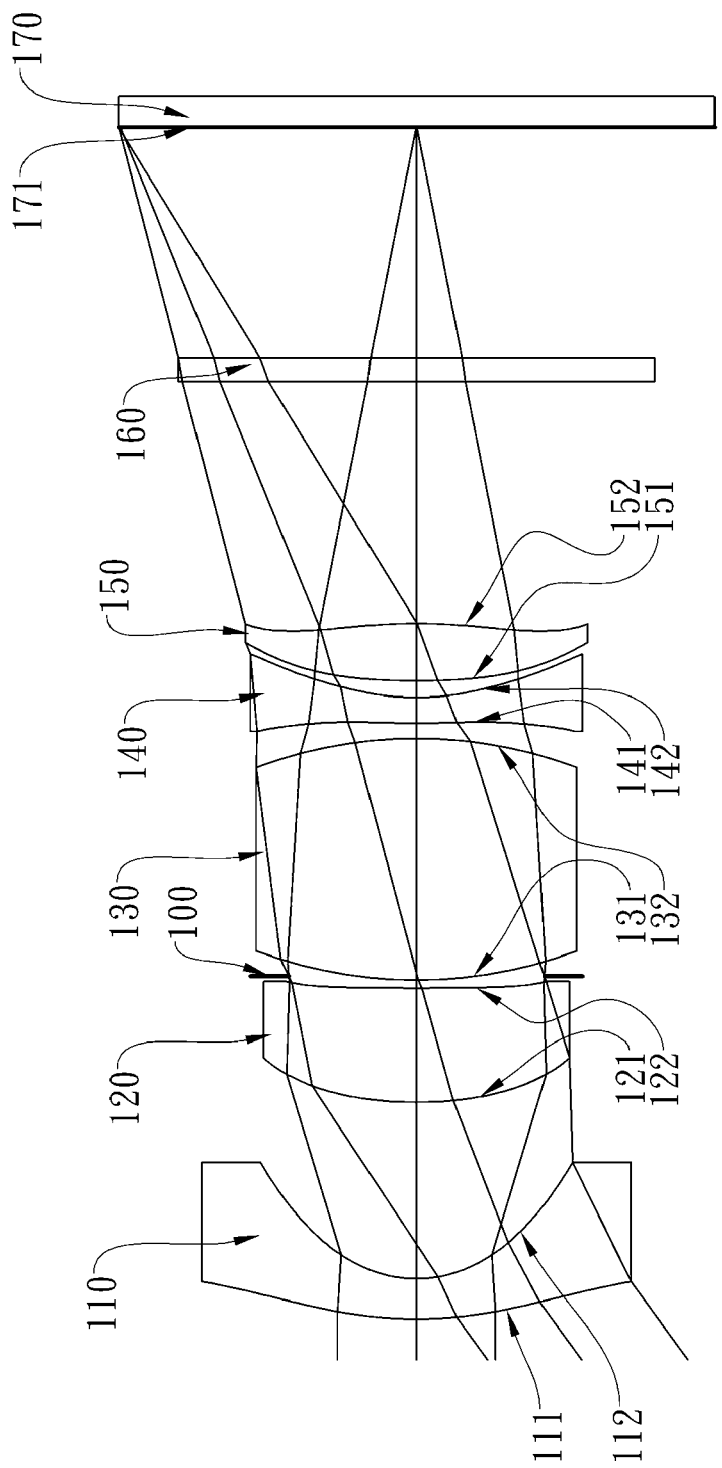
FIG. 1A shows an image-capturing optical lens assembly in accordance with a first embodiment of the present invention.

The present invention provides an image-capturing optical lens assembly comprising, in order from an object side to an image side, a front lens group, an aperture stop, and a rear lens group. The front lens group comprises, in order from the object side to the image side: a first lens element with negative refractive power having a convex object-side surface and a concave image-side surface; and a second lens element with positive refractive power having a convex object-side surface and a concave image-side surface. The rear lens group comprises, in order from the object side to the image side: a third lens element with positive refractive power having a convex object-side surface and a convex image-side surface; a fourth lens element with negative refractive power; and a fifth lens element with positive refractive power having a convex image-side surface, wherein a central thickness of the fifth lens element is CT5, a focal length of the lens assembly is f, a curvature radius of the object-side surface of the first lens element is R1, a curvature radius of the image-side surface of the fifth lens element is R10, and they satisfy the following relations: $0<CT5/f<0.7$; $0<R1/f<5.5$; and $R10/f<-0.85$.

When the relation of $0<CT5/f<0.7$ is satisfied, the thickness of the fifth lens element is more favorable. As a result, a balance between improving the yield rate of the lens production process and correcting aberrations of the system can be favorably achieved; also, plastic lens products will be formed more easily with a higher homogeneity during the injection molding process.

When the relation of $0<R1/f<5.5$ is satisfied, the refraction of incident light is more moderate as the field of view of the system is enlarged, thereby preventing aberrations from increasing excessively.

When the relation of $R10/f<-0.85$ is satisfied, astigmatisms of the system can be effectively corrected, thereby improving image quality of the system.

In the aforementioned image-capturing optical lens assembly, an axial distance between the first lens element and the second lens element is T12, an axial distance between the second lens element and the third lens element is T23, and preferably, they satisfy the following relation: $0<T23/T12<0.65$. When this relation is satisfied, the axial distance between the second lens element and the third lens element and the distance between the first lens element and the second lens element are more favorable, so that the distances are not too short to make the assembling process difficult, or too long to affect minimizing the size of the lens assembly. More preferably, the following relation is satisfied: $0<T23/T12<0.2$.

In the aforementioned image-capturing optical lens assembly, the focal length of the lens assembly is f, a focal length of the first lens element is f1, and preferably, they satisfy the following relation: $-1.6<f/f1<-0.6$. When this relation is satisfied, a balance between enlarging the field of view of the system and reducing the total track length of the lens assembly can be favorably achieved. More preferably, the following relation is satisfied: $-1.3<f/f1<-0.9$.

In the aforementioned image-capturing optical lens assembly, an axial distance between the aperture stop and an image plane is SL, an axial distance between the object-side surface of the first lens element and the image plane is TTL, and preferably, they satisfy the following relation: $0.55<SL/TTL<0.85$. When this relation is satisfied, the exit pupil of the lens assembly can be positioned far away from the image plane; thus, light will be projected onto the electronic sensor at a nearly perpendicular angle, and this is the telecentric feature of the image side. The telecentric feature is very important to the photosensitive ability of the current solid-state sensor because it can improve the photosensitivity of the sensor to reduce the probability of the occurrence of shading.

In the aforementioned image-capturing optical lens assembly, an Abbe number of the third lens element is V3, an Abbe number of the fourth lens element is V4, and preferably, they satisfy the following relation: $28<V3-V4<45$. When this relation is satisfied, the chromatic aberration of the lens assembly can be favorably corrected.

In the aforementioned image-capturing optical lens assembly, the focal length of the lens assembly is f, a focal length of the second lens element is f2, and preferably, they satisfy the following relation: $0.2<f/f2<0.8$. When this relation is satisfied, the refractive power of the second lens element can be prevented from becoming too large; as a result, aberrations of the lens assembly can be favorably reduced and sensitivity of the system can be lowered. More preferably, the following relation is satisfied: $0.35<f/f2<0.7$.

In the aforementioned image-capturing optical lens assembly, a curvature radius of the object-side surface of the second lens element is R3, a curvature radius of the image-side surface of the second lens element is R4, and preferably, they satisfy the following relation: 0<R3/R4<0.5. When this relation is satisfied, astigmatisms of the system can be favorably corrected, and the refractive power can be properly adjusted; as a result, image resolution of the system can be increased, and aberrations of the lens assembly can be corrected.

In the aforementioned image-capturing optical lens assembly, the curvature radius of the object-side surface of the third lens element is R5, a curvature radius of the image-side surface of the third lens element is R6, and preferably, they satisfy the following relation: −2.0<R6/R5<−0.2. When this relation is satisfied, spherical aberrations of the system can be favorably corrected; as a result, the refractive power of the system can be properly distributed, thereby lowering the sensitivity of the system.

In the aforementioned image-capturing optical lens assembly, the focal length of the lens assembly is f, a focal length of the third lens element is f3, a focal length of the fourth lens element is f4, and preferably, they satisfy the following relation: 0<f/f3−|f/f4|<0.5. When this relation is satisfied, the refractive power of the third and fourth lens elements can be distributed more properly; as a result, the sensitivity of the system can be effectively controlled, and aberrations of the lens assembly can be corrected.

In the aforementioned image-capturing optical lens assembly, half of the maximum field of view of the lens assembly is HFOV, and preferably, it satisfies the following relation: 35 degrees<HFOV<45 degrees. When this relation is satisfied, the maximum field of view of the lens assembly is more favorable.

In the aforementioned image-capturing optical lens assembly, a central thickness of the third lens element is CT3, a central thickness of the fourth lens element is CT4, and preferably, they satisfy the following relation: 0<CT4/CT3<0.3. When this relation is satisfied, the thickness of either the third lens element or the fourth lens element is more favorable for assembling the lens assembly and arranging the space within it.

In the present image-capturing optical lens assembly, the lens elements can be made of glass or plastic material. If the lens elements are made of glass, the freedom for distributing the refractive power of the imaging optical lens assembly can be increased. If plastic material is adopted to produce the lens elements, the production cost will be reduced effectively. Moreover, the lens elements of the assembly can have aspheric surfaces. This allows more design parameters for the system since aspheric surfaces can be easily made into non-spherical profiles; also, it will reduce aberrations and the total number of lens elements, so that the total track length of the lens assembly can be effectively reduced.

In the present image-capturing optical lens assembly, if a lens element is described to have a convex surface, it means the portion of the surface in proximity to the optical axis is convex; if a lens element is described to have a concave surface, it means the portion of the surface in proximity to the optical axis is concave.

In the present image-capturing optical lens assembly, there can be at least one aperture stop, such as a glare stop or field stop, provided for eliminating stray light, thereby promoting image resolution of the lens assembly.

Preferred embodiments of the present invention will be described in the following paragraphs by referring to the accompanying drawings.

Embodiment 1

Figure 1B:
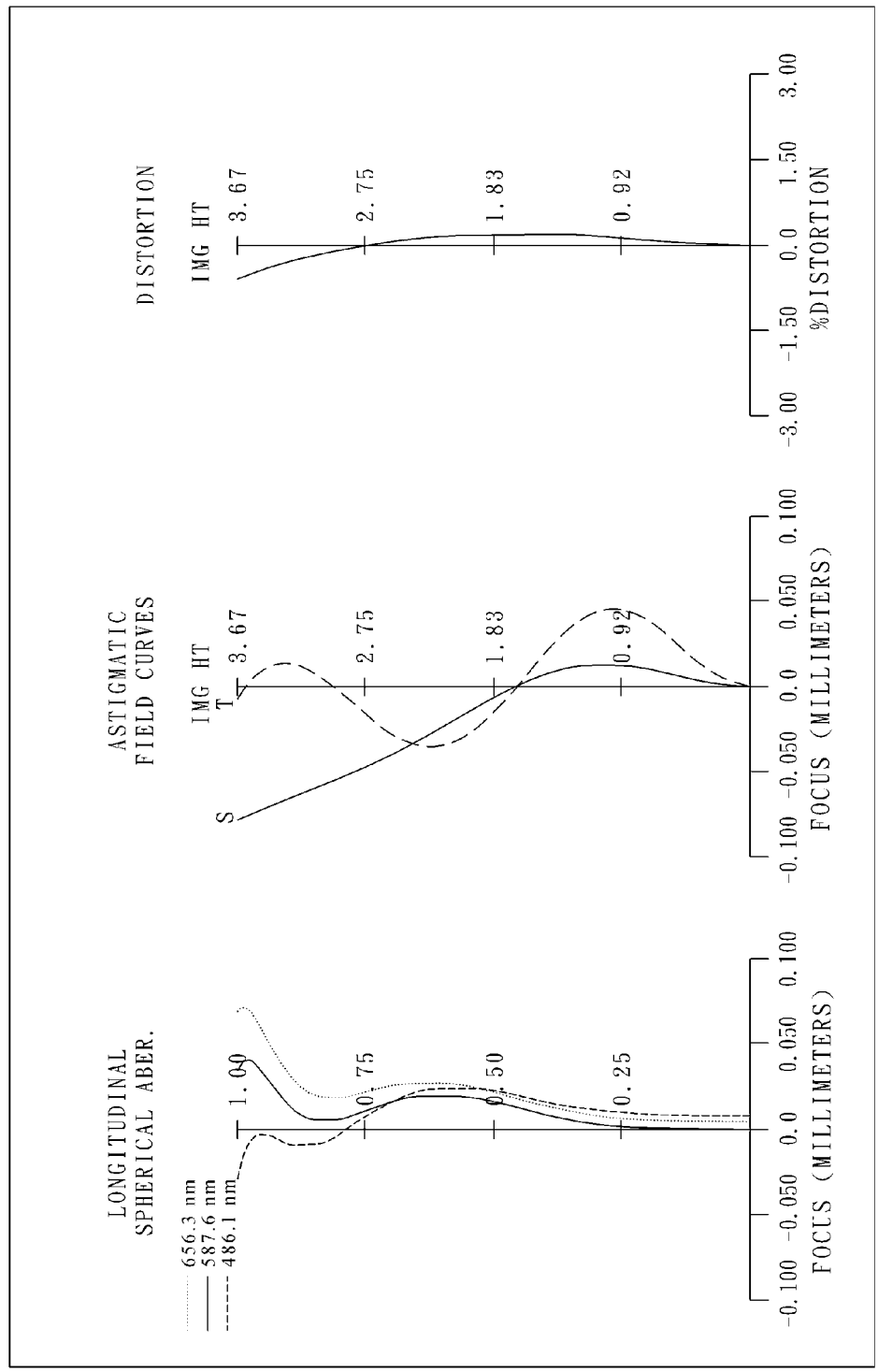
FIG. 1B shows the aberration curves of the first embodiment of the present invention.

FIG. 1A shows an image-capturing optical lens assembly in accordance with the first embodiment of the present invention, and FIG. 1B shows the aberration curves of the first embodiment of the present invention. The image-capturing optical lens assembly in the first embodiment mainly comprises five lens elements, in order from an object side to an image side: a front lens group, an aperture stop 100 and a rear lens group, wherein:

the front lens group comprises, in order from the object side to the image side:

a plastic first lens element 110 with negative refractive power having a convex object-side surface 111 and a concave image-side surface 112, both of the surfaces 111 and 112 being aspheric; and a plastic second lens element 120 with positive refractive power having a convex object-side surface 121 and a concave image-side surface 122, both of the surfaces 121 and 122 being aspheric;

the rear lens group comprises, in order from the object side to the image side:

a glass third lens element 130 with positive refractive power having a convex object-side surface 131 and a convex image-side surface 132;

a plastic fourth lens element 140 with negative refractive power having a convex object-side surface 141 and a concave image-side surface 142, both of the surfaces 141 and 142 being aspheric; and a plastic fifth lens element 150 with positive refractive power having a convex object-side surface 151 and a convex image-side surface 152, both of the surfaces 151 and 152 being aspheric.

Moreover, the image-capturing optical lens assembly comprises an IR filter 160 disposed between the image-side surface 152 of the fifth lens element 150 and an image plane 171; the IR filter 160 is made of glass and has no influence on the focal length of the image-capturing optical lens assembly. The image-capturing optical lens assembly further comprises an image sensor 170 provided on the image plane 171.

The detailed optical data of the first embodiment is shown in TABLE 1, and the aspheric surface data is shown in TABLE 2, wherein the units of the curvature radius, the thickness and the focal length are expressed in mm, and HFOV is half of the maximum field of view.

TABLE 1

(Embodiment 1)
f = 5.05 mm, Fno = 2.58, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.958200 (ASP) | 0.500 | Plastic | 1.544 | 55.9 | −4.37 |

TABLE 1-continued (Embodiment 1)
f = 5.05 mm, Fno = 2.58, HFOV = 36.1 deg.

| Surface # | | Curvature Radius | Thickness | Material | Index | Abbe # | Focal length |
|---|---|---|---|---|---|---|---|
| 2 | | 1.550560 (ASP) | 2.190 | | | | |
| 3 | Lens 2 | 4.863100 (ASP) | 1.417 | Plastic | 1.544 | 55.9 | 9.39 |
| 4 | | 90.909100 (ASP) | 0.150 | | | | |
| 5 | Ape. Stop | Plano | −0.050 | | | | |
| 6 | Lens 3 | 5.636 | 2.999 | Glass | 1.620 | 60.3 | 5.06 |
| 7 | | −5.636 | 0.187 | | | | |
| 8 | Lens 4 | 11.216700 (ASP) | 0.318 | Plastic | 1.634 | 23.8 | −5.78 |
| 9 | | 2.731180 (ASP) | 0.210 | | | | |
| 10 | Lens 5 | 9.114500 (ASP) | 0.711 | Plastic | 1.544 | 55.9 | 7.28 |
| 11 | | −6.818800 (ASP) | 3.000 | | | | |
| 12 | IR-filter | Plano | 0.300 | Glass | 1.516 | 64.1 | — |
| 13 | | Plano | 2.859 | | | | |
| 14 | Image | Plano | — | | | | |

Reference wavelength is 587.6 nm (d-line)

TABLE 2

Aspheric Coefficients

| Surface # | 1 | 2 | 3 | 4 |
|---|---|---|---|---|
| k = | −2.66212E+00 | −9.85189E−01 | 0.00000E+00 | 1.81788E+02 |
| A4 = | −9.91825E−04 | 1.93492E−02 | 8.02061E−03 | 4.70355E−03 |
| A6 = | −1.06236E−03 | −1.05880E−03 | 1.70387E−03 | 2.56067E−03 |
| A8 = | 1.50007E−04 | 1.93798E−04 | −4.65386E−04 | −8.41304E−04 |
| A10 = | −7.33746E−06 | −3.18585E−05 | 1.01368E−04 | 2.53861E−04 |

| Surface # | 8 | 9 | 10 | 11 |
|---|---|---|---|---|
| k = | −9.90000E+01 | −7.57922E+00 | −1.00000E+00 | −6.57179E+01 |
| A4 = | −3.57307E−02 | −2.34316E−03 | 1.31669E−02 | −1.04651E−02 |
| A6 = | 9.47609E−03 | 1.71494E−03 | 3.62072E−04 | 9.49392E−03 |
| A8 = | −9.33684E−04 | 3.60013E−04 | −2.27327E−04 | −1.86708E−03 |
| A10 = | −5.84118E−05 | −1.10415E−04 | 1.39560E−05 | 1.55424E−04 |
| A12 = | 1.10023E−05 | | | |
| A14 = | −4.17134E−07 | | | |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present image-capturing optical lens assembly, the focal length of the lens assembly is f, and it satisfies the relation: f=5.05 (mm).

In the first embodiment of the present image-capturing optical lens assembly, the f-number of the lens assembly is Fno, and it satisfies the relation: Fno=2.58.

In the first embodiment of the present image-capturing optical lens assembly, half of the maximum field of view of the lens assembly is HFOV, and it satisfies the relation: HFOV=36.1 (degrees).

In the first embodiment of the present image-capturing optical lens assembly, the Abbe number of the third lens element 130 is V3, the Abbe number of the fourth lens element 140 is V4, and they satisfy the relation: V3−V4=36.5.

In the first embodiment of the present image-capturing optical lens assembly, the central thickness of the fifth lens element 150 is CT5, the focal length of the lens assembly is f, and they satisfy the relation: CT5/f=0.14.

In the first embodiment of the present image-capturing optical lens assembly, the central thickness of the third lens element 130 is CT3, the central thickness of the fourth lens element 140 is CT4, and they satisfy the relation: CT4/CT3=0.11.

In the first embodiment of the present image-capturing optical lens assembly, the axial distance between the first lens element 110 and the second lens element 120 is T12, the axial distance between the second lens element 120 and the third lens element 130 is T23, and they satisfy the relation: T23/T12=0.05.

In the first embodiment of the present image-capturing optical lens assembly, the focal length of the lens assembly is f, the curvature radius of the object-side surface 111 of the first lens element 110 is R1, and they satisfy the relation: R1/f=0.98.

In the first embodiment of the present image-capturing optical lens assembly, the focal length of the lens assembly is f, the curvature radius of the image-side surface 152 of the fifth lens element 150 is R10, and they satisfy the relation: R10/f=−1.35.

In the first embodiment of the present image-capturing optical lens assembly, the curvature radius of the object-side surface 121 of the second lens element 120 is R3, the curvature radius of the image-side surface 122 of the second lens element 120 is R4, and they satisfy the relation: R3/R4=0.05.

In the first embodiment of the present image-capturing optical lens assembly, the curvature radius of the object-side surface 131 of the third lens element 130 is R5, the curvature radius of the image-side surface 132 of the third lens element 130 is R6, and they satisfy the relation: R6/R5=−1.00.

In the first embodiment of the present image-capturing optical lens assembly, the focal length of the lens assembly is f, the focal length of the first lens element 110 is f1, and they satisfy the relation: f/f1=−1.16.

In the first embodiment of the present image-capturing optical lens assembly, the focal length of the lens assembly is f, the focal length of the second lens element 120 is f2, and they satisfy the relation: f/f2=0.54.

In the first embodiment of the present image-capturing optical lens assembly, the focal length of the lens assembly is f, the focal length of the third lens element 130 is f3, the focal length of the fourth lens element 140 is f4, and they satisfy the relation: f/f3−|f/f4|=0.13.

In the first embodiment of the present image-capturing optical lens assembly, the axial distance between the aperture stop 100 and the image plane 171 is SL, the axial distance between the object-side surface 111 of the first lens element 110 and the image plane 171 is TTL, and they satisfy the following relation: SL/TTL=0.71.

Embodiment 2

Figure 2A:
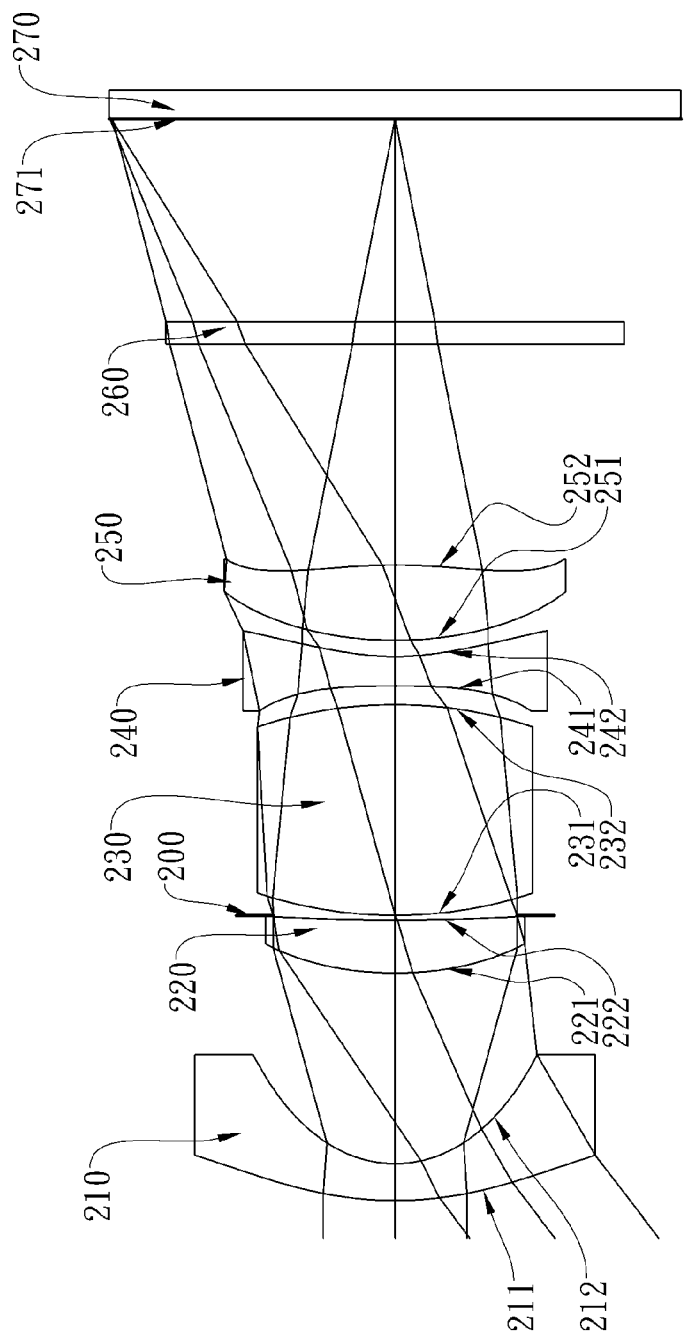
FIG. 2A shows an image-capturing optical lens assembly in accordance with a second embodiment of the present invention.
Figure 2B:
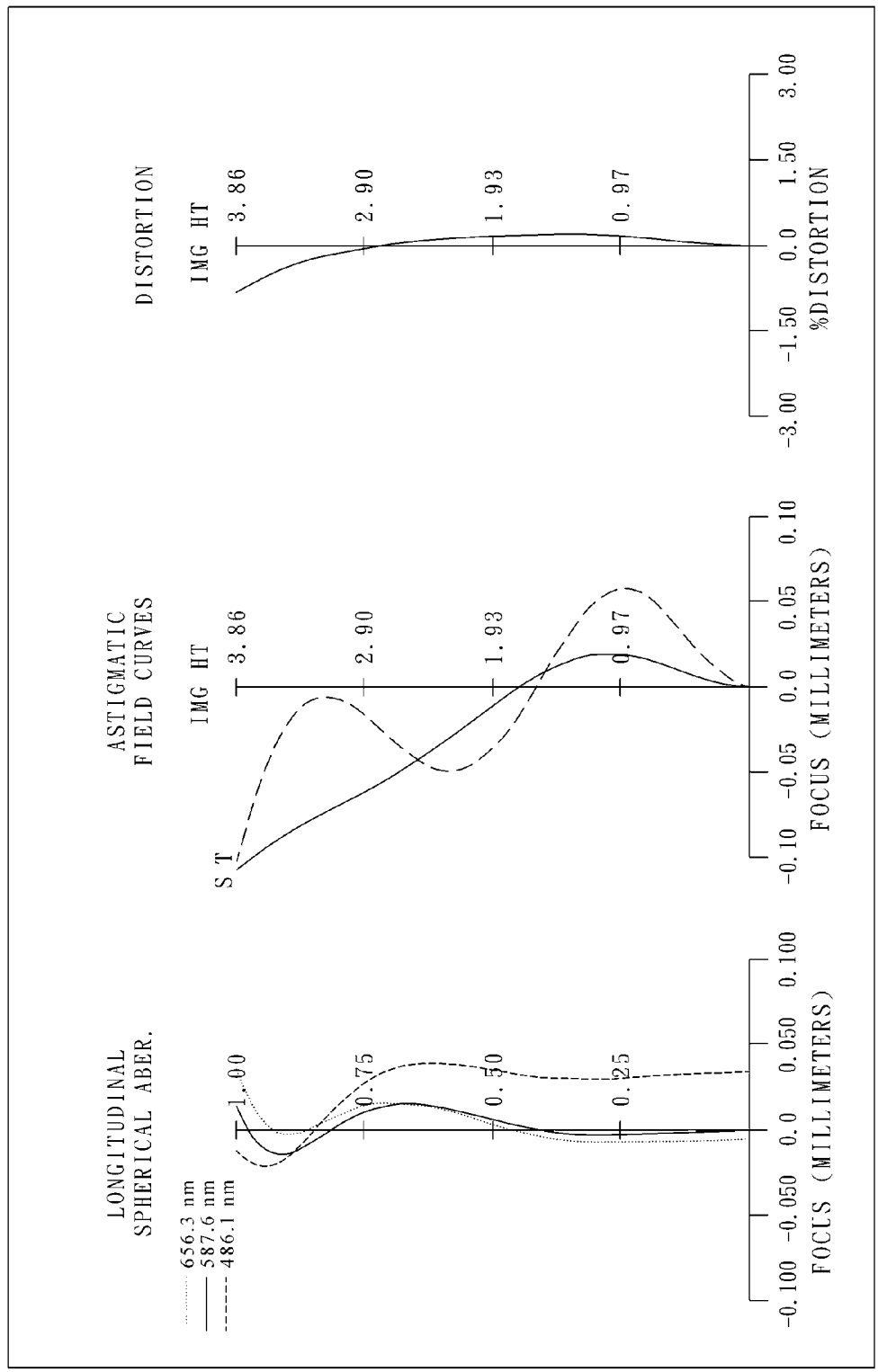
FIG. 2B shows the aberration curves of the second embodiment of the present invention.

FIG. 2A shows an image-capturing optical lens assembly in accordance with the second embodiment of the present invention, and FIG. 2B shows the aberration curves of the second embodiment of the present invention. The image-capturing optical lens assembly in the second embodiment mainly comprises five lens elements, in order from an object side to an image side: a front lens group, an aperture stop 200 and a rear lens group, wherein:

the front lens group comprises, in order from the object side to the image side:

a plastic first lens element 210 with negative refractive power having a convex object-side surface 211 and a concave image-side surface 212, both of the surfaces 211 and 212 being aspheric; and a plastic second lens element 220 with positive refractive power having a convex object-side surface 221 and a concave image-side surface 222, both of the surfaces 221 and 222 being aspheric;

the rear lens group comprises, in order from the object side to the image side:

a glass third lens element 230 with positive refractive power having a convex object-side surface 231 and a convex image-side surface 232;

a plastic fourth lens element 240 with negative refractive power having a concave object-side surface 241 and a concave image-side surface 242, both of the surfaces 241 and 242 being aspheric; and a plastic fifth lens element 250 with positive refractive power having a convex object-side surface 251 and a convex image-side surface 252, both of the surfaces 251 and 252 being aspheric.

Moreover, the image-capturing optical lens assembly comprises an IR filter 260 disposed between the image-side surface 252 of the fifth lens element 250 and an image plane 271; the IR filter 260 is made of glass and has no influence on the focal length of the image-capturing optical lens assembly. The image-capturing optical lens assembly further comprises an image sensor 270 provided on the image plane 271.

The detailed optical data of the second embodiment is shown in TABLE 3, and the aspheric surface data is shown in TABLE 4, wherein the units of the curvature radius, the thickness and the focal length are expressed in mm, and HFOV is half of the maximum field of view.

TABLE 3

(Embodiment 2)
f = 5.06 mm, Fno = 2.60, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.900400 (ASP) | 0.500 | Plastic | 1.544 | 55.9 | −4.62 |
| 2 | | 1.602890 (ASP) | 2.584 | | | | |
| 3 | Lens 2 | 4.474300 (ASP) | 0.719 | Plastic | 1.544 | 55.9 | 9.74 |
| 4 | | 27.027000 (ASP) | 0.063 | | | | |
| 5 | Ape. Stop | Plano | 0.000 | | | | |
| 6 | Lens 3 | 5.881 | 2.861 | Glass | 1.620 | 60.3 | 5.23 |
| 7 | | −5.881 | 0.249 | | | | |
| 8 | Lens 4 | −32.258100 (ASP) | 0.400 | Plastic | 1.634 | 23.8 | −4.77 |
| 9 | | 3.354500 (ASP) | 0.220 | | | | |
| 10 | Lens 5 | 5.011800 (ASP) | 1.021 | Plastic | 1.544 | 55.9 | 5.85 |
| 11 | | −8.091100 (ASP) | 3.000 | | | | |
| 12 | IR-filter | Plano | 0.300 | Glass | 1.516 | 64.1 | — |
| 13 | | Plano | 2.750 | | | | |
| 14 | Image | Plano | — | | | | |

Reference wavelength is 587.6 nm (d-line)

TABLE 4

Aspheric Coefficients

| Surface # | 1 | 2 | 3 | 4 |
|---|---|---|---|---|
| k = | −9.19767E−01 | −9.14913E−01 | 0.00000E+00 | −9.90000E+01 |
| A4 = | 7.93210E−04 | 1.97695E−02 | 1.78951E−03 | −2.58009E−03 |

TABLE 4-continued

| Aspheric Coefficients | | | | |
|---|---|---|---|---|
| A6 = | −1.11658E−03 | −1.01271E−03 | 1.84376E−03 | 2.65280E−03 |
| A8 = | 1.38186E−04 | 4.77678E−04 | −9.11364E−04 | −1.34106E−03 |
| A10 = | −6.70122E−06 | −3.06769E−05 | 1.83308E−04 | 2.63586E−04 |

| Surface # | 8 | 9 | 10 | 11 |
|---|---|---|---|---|
| k = | 9.90000E+01 | −1.05548E+01 | −8.78235E+00 | −9.90000E+01 |
| A4 = | −3.78139E−02 | −8.05331E−03 | 8.56318E−03 | −9.80453E−03 |
| A6 = | 7.89218E−03 | 1.25618E−03 | 2.06395E−04 | 8.43274E−03 |
| A8 = | −1.07829E−03 | 3.59354E−04 | −1.76958E−04 | −1.67425E−03 |
| A10 = | −4.02626E−06 | −8.84571E−05 | 2.91877E−05 | 1.41778E−04 |
| A12 = | 3.89571E−06 | | | |
| A14 = | −3.16608E−06 | | | |

The equation of the aspheric surface profiles of the second embodiment has the same form as that of the first embodiment. Moreover, the definitions of the parameters of the relations are the same as those set forth in the first embodiment, but the value of the relations of the second embodiment are listed in the following TABLE 5:

TABLE 5

(Embodiment 2)

| | |
|---|---|
| f | 5.06 |
| Fno | 2.60 |
| HFOV | 37.6 |
| V3-V4 | 36.5 |
| CT5/f | 0.20 |
| CT4/CT3 | 0.14 |
| T23/T12 | 0.02 |
| R1/f | 0.97 |
| R10/f | −1.60 |
| R3/R4 | 0.17 |
| R6/R5 | −1.00 |
| f/f1 | −1.10 |
| f/f2 | 0.52 |
| f/f3−|f/f4| | −0.09 |
| SL/TTL | 0.74 |

Embodiment 3

Figure 3A:
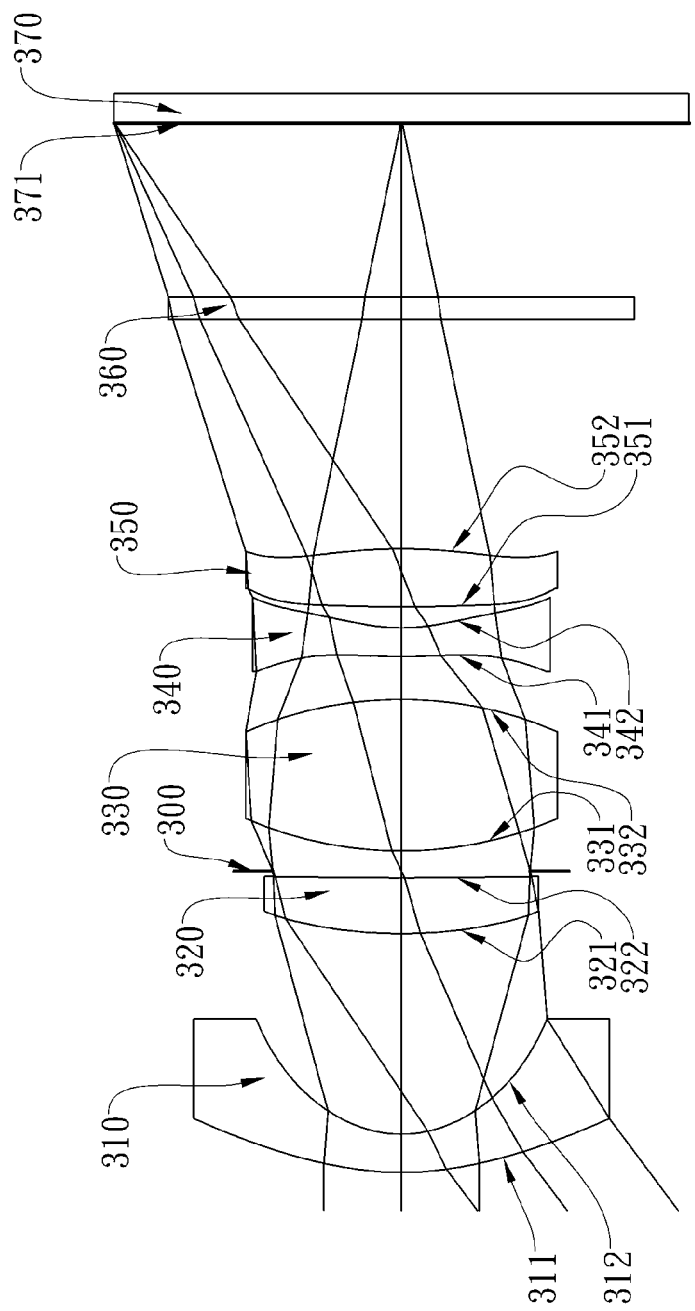
FIG. 3A shows an image-capturing optical lens assembly in accordance with a third embodiment of the present invention.
Figure 3B:
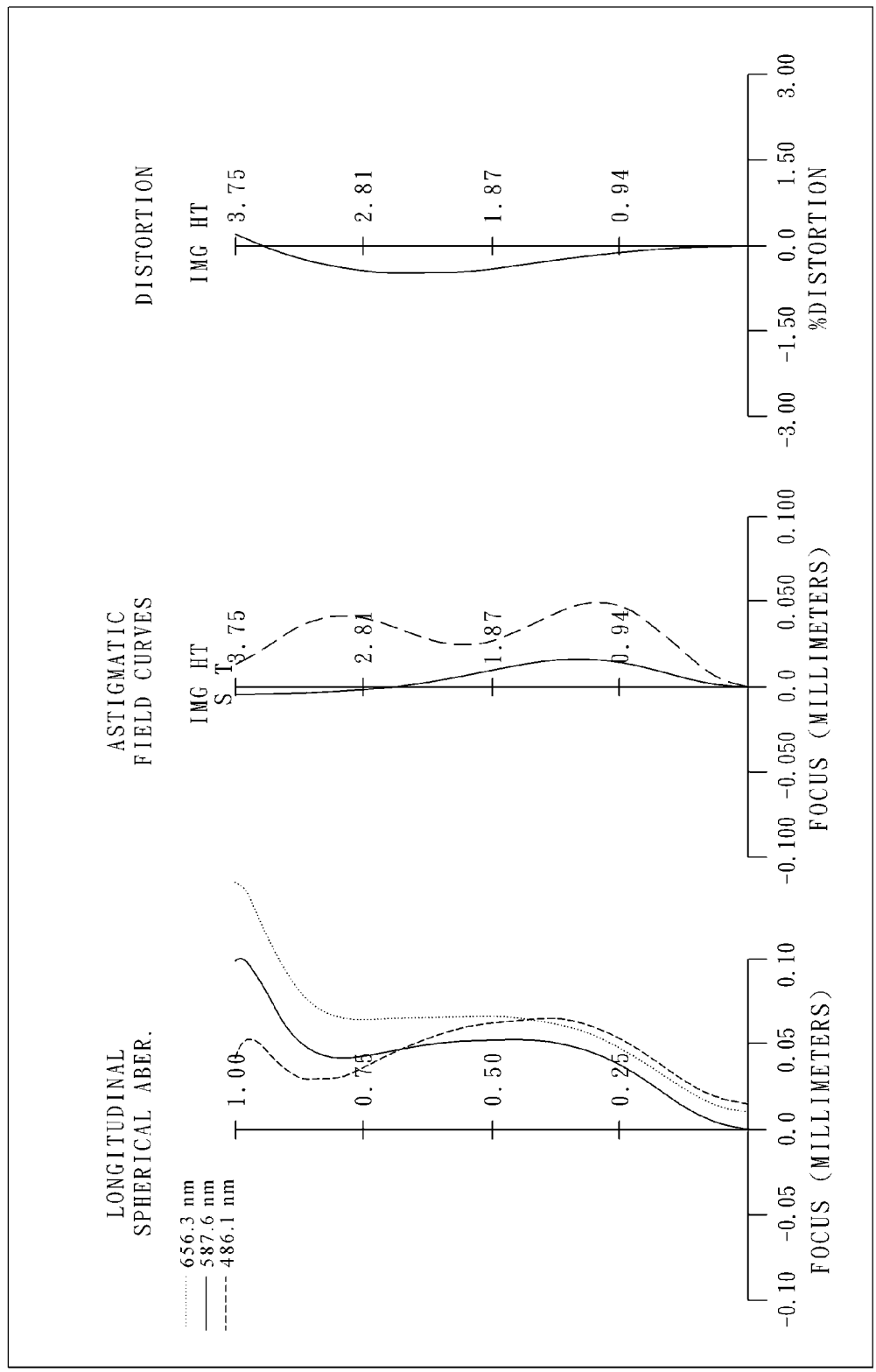
FIG. 3B shows the aberration curves of the third embodiment of the present invention.

FIG. 3A shows an image-capturing optical lens assembly in accordance with the third embodiment of the present invention, and FIG. 3B shows the aberration curves of the third embodiment of the present invention. The image-capturing optical lens assembly in the third embodiment mainly comprises five lens elements, in order from an object side to an image side: a front lens group, an aperture stop 300 and a rear lens group, wherein:

the front lens group comprises, in order from the object side to the image side:

a plastic first lens element 310 with negative refractive power having a convex object-side surface 311 and a concave image-side surface 312, both of the surfaces 311 and 312 being aspheric; and a plastic second lens element 320 with positive refractive power having a convex object-side surface 321 and a concave image-side surface 322, both of the surfaces 321 and 322 being aspheric;

the rear lens group comprises, in order from the object side to the image side:

a glass third lens element 330 with positive refractive power having a convex object-side surface 331 and a convex image-side surface 332;

a plastic fourth lens element 340 with negative refractive power having a convex object-side surface 341 and a concave image-side surface 342, both of the surfaces 341 and 342 being aspheric; and a plastic fifth lens element 350 with positive refractive power having a convex object-side surface 351 and a convex image-side surface 352, both of the surfaces 351 and 352 being aspheric.

Moreover, the image-capturing optical lens assembly comprises an IR filter 360 disposed between the image-side surface 352 of the fifth lens element 350 and an image plane 371; the IR filter 360 is made of glass and has no influence on the focal length of the image-capturing optical lens assembly. The image-capturing optical lens assembly further comprises an image sensor 370 provided on the image plane 371.

The detailed optical data of the third embodiment is shown in TABLE 6, and the aspheric surface data is shown in TABLE 7, wherein the units of the curvature radius, the thickness and the focal length are expressed in mm, and HFOV is half of the maximum field of view.

TABLE 6

(Embodiment 3)
f = 4.97 mm, Fno = 2.45, HFOV = 36.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.903100 (ASP) | 0.500 | Plastic | 1.544 | 55.9 | −4.98 |
| 2 | | 1.527190 (ASP) | 2.625 | | | | |
| 3 | Lens 2 | 5.843600 (ASP) | 0.731 | Plastic | 1.544 | 55.9 | 12.51 |
| 4 | | 39.525700 (ASP) | 0.087 | | | | |
| 5 | Ape. Stop | Plano | 0.265 | | | | |
| 6 | Lens 3 | 5.106 | 1.985 | Glass | 1.620 | 60.3 | 4.45 |
| 7 | | −5.106 | 0.558 | | | | |
| 8 | Lens 4 | 6.117100 (ASP) | 0.379 | Plastic | 1.650 | 21.4 | −5.74 |

TABLE 6-continued (Embodiment 3)
f = 4.97 mm, Fno = 2.45, HFOV = 36.8 deg.

| Surface # | | Curvature Radius | Thickness | Material | Index | Abbe # | Focal length |
|---|---|---|---|---|---|---|---|
| 9 | | 2.260930 (ASP) | 0.273 | | | | |
| 10 | Lens 5 | 15.518200 (ASP) | 0.761 | Plastic | 1.544 | 55.9 | 8.83 |
| 11 | | −6.840000 (ASP) | 3.000 | | | | |
| 12 | IR-filter | Plano | 0.300 | Glass | 1.516 | 64.1 | — |
| 13 | | Plano | 2.275 | | | | |
| 14 | Image | Plano | — | | | | |

Reference wavelength is 587.6 nm (d-line)

TABLE 7

Aspheric Coefficients

| Surface # | 1 | 2 | 3 | 4 |
|---|---|---|---|---|
| k = | −9.67365E+00 | −1.68564E+00 | 1.67011E−01 | 9.90000E+01 |
| A4 = | 2.98561E−03 | 2.38590E−02 | −4.08657E−03 | −7.00761E−03 |
| A6 = | 1.04816E−04 | 3.86679E−03 | 2.45400E−03 | 2.14683E−03 |
| A8 = | −3.37644E−05 | −3.41349E−04 | −7.78605E−04 | −7.24526E−04 |
| A10 = | 1.10343E−06 | 1.58511E−04 | 1.68737E−04 | 1.84945E−04 |

| Surface # | 8 | 9 | 10 | 11 |
|---|---|---|---|---|
| k = | −9.41194E+01 | −9.75135E+00 | −1.00000E+00 | −5.04290E+01 |
| A4 = | −4.55826E−02 | −2.01345E−02 | −1.58320E−02 | −1.32994E−02 |
| A6 = | 7.60709E−03 | 2.30888E−03 | 5.80290E−03 | 7.71855E−03 |
| A8 = | −8.04223E−04 | 9.26813E−04 | 5.16494E−04 | −5.14221E−04 |
| A10 = | 2.92612E−05 | −9.83143E−05 | −1.39156E−04 | −1.72975E−05 |
| A12 = | 1.03020E−05 | | | |
| A14 = | −4.43366E−07 | | | |

The equation of the aspheric surface profiles of the third embodiment has the same form as that of the first embodiment. Moreover, the definitions of the parameters of the relations are the same as those set forth in the first embodiment, but the value of the relations of the third embodiment are listed in the following TABLE 8:

TABLE 8

(Embodiment 3)

| f | 4.97 |
|---|---|
| Fno | 2.45 |
| HFOV | 36.8 |
| V3−V4 | 38.9 |
| CT5/f | 0.15 |
| CT4/CT3 | 0.19 |
| T23/T12 | 0.13 |
| R1/f | 0.79 |
| R10/f | −1.38 |
| R3/R4 | 0.15 |
| R6/R5 | −1.00 |
| f/f1 | −1.00 |
| f/f2 | 0.40 |
| f/f3−|f/f4| | 0.25 |
| SL/TTL | 0.71 |

Embodiment 4

Figure 4A:
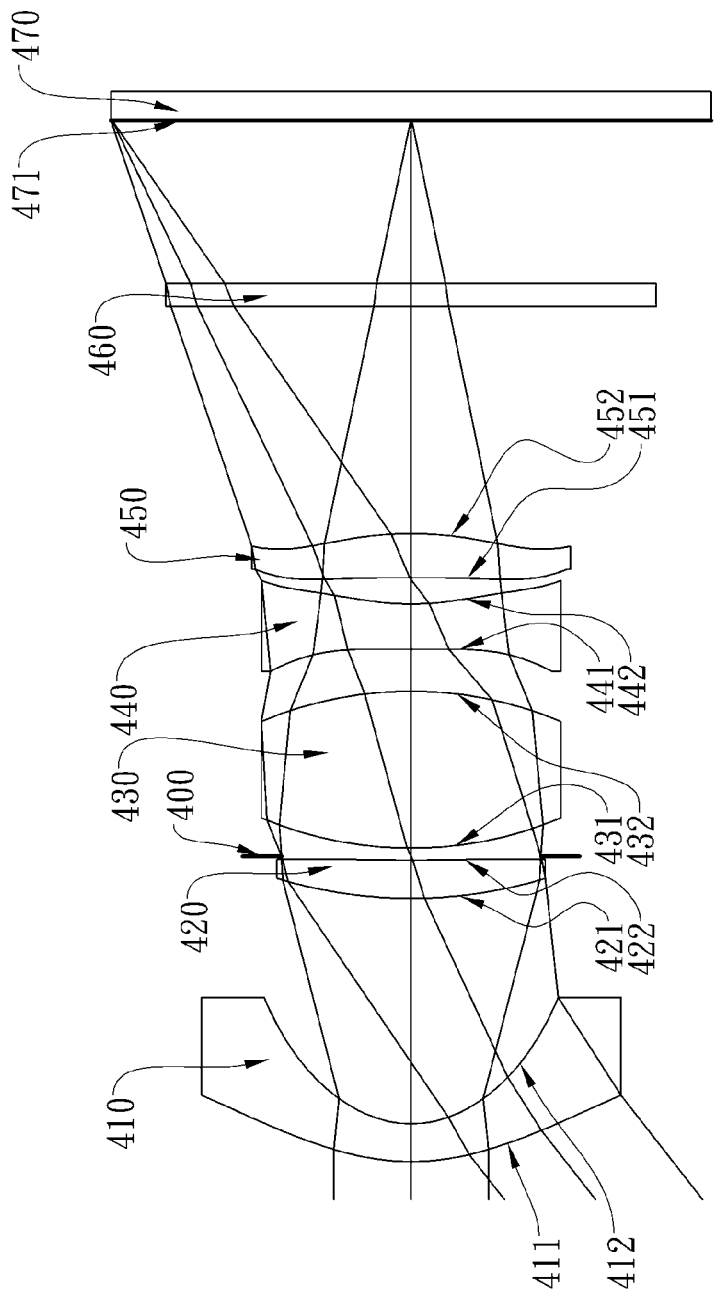
FIG. 4A shows an image-capturing optical lens assembly in accordance with a fourth embodiment of the present invention.
Figure 4B:
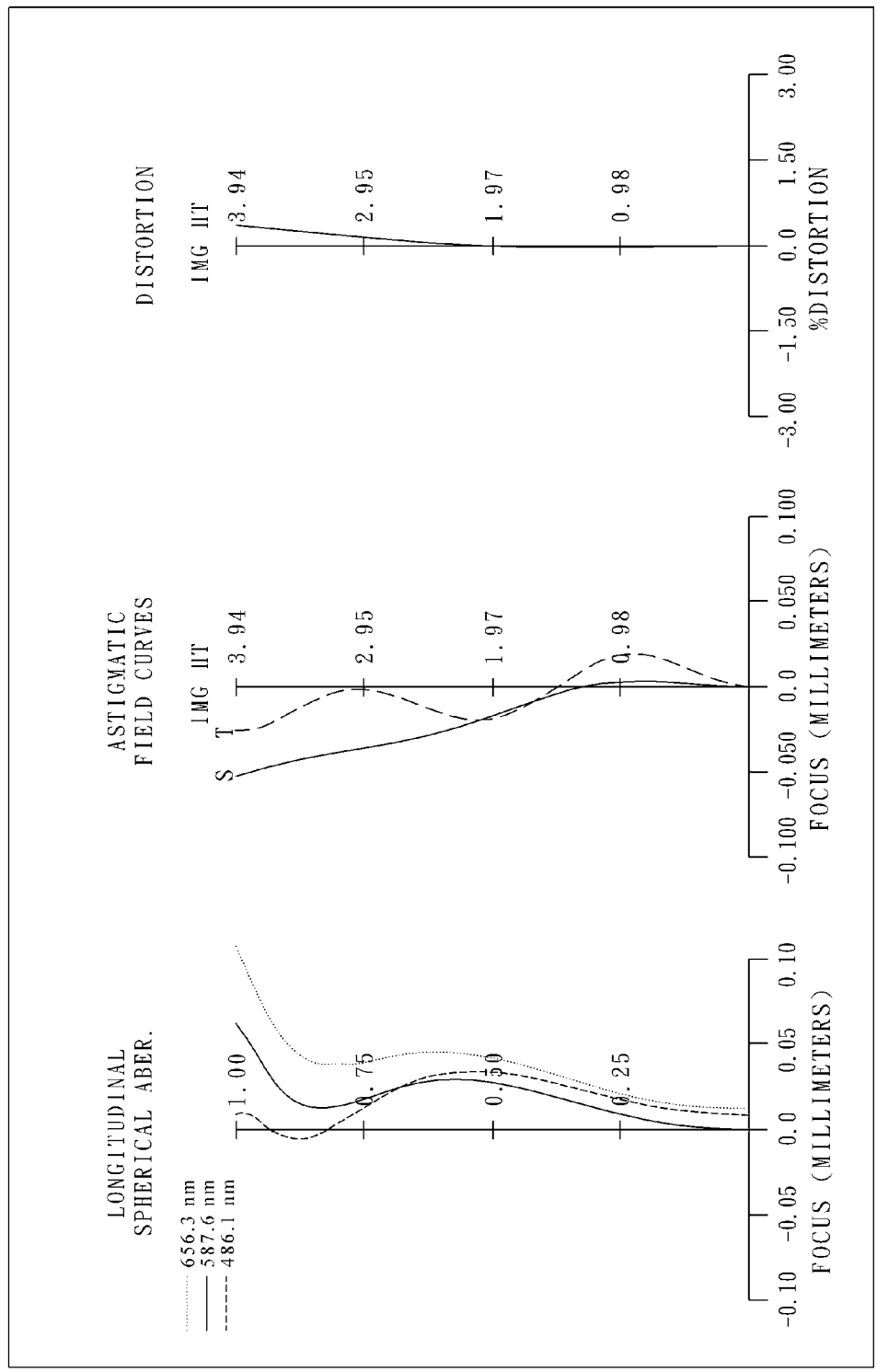
FIG. 4B shows the aberration curves of the fourth embodiment of the present invention.

FIG. 4A shows an image-capturing optical lens assembly in accordance with the fourth embodiment of the present invention, and FIG. 4B shows the aberration curves of the fourth embodiment of the present invention. The image-capturing optical lens assembly in the fourth embodiment mainly comprises five lens elements, in order from an object side to an image side: a front lens group, an aperture stop 400 and a rear lens group, wherein:

the front lens group comprises, in order from the object side to the image side:

a plastic first lens element 410 with negative refractive power having a convex object-side surface 411 and a concave image-side surface 412, both of the surfaces 411 and 412 being aspheric; and a plastic second lens element 420 with positive refractive power having a convex object-side surface 421 and a concave image-side surface 422, both of the surfaces 421 and 422 being aspheric;

the rear lens group comprises, in order from the object side to the image side:

a glass third lens element 430 with positive refractive power having a convex object-side surface 431 and a convex image-side surface 432;

a plastic fourth lens element 440 with negative refractive power having a convex object-side surface 441 and a concave image-side surface 442, both of the surfaces 441 and 442 being aspheric; and a plastic fifth lens element 450 with positive refractive power having a concave object-side surface 451 and a convex image-side surface 452, both of the surfaces 451 and 452 being aspheric.

Moreover, the image-capturing optical lens assembly comprises an IR filter 460 disposed between the image-side surface 452 of the fifth lens element 450 and an image plane 471; the IR filter 460 is made of glass and has no influence on the focal length of the image-capturing optical lens assembly. The image-capturing optical lens assembly further comprises an image sensor 470 provided on the image plane 471.

The detailed optical data of the fourth embodiment is shown in TABLE 9, and the aspheric surface data is shown in TABLE 10, wherein the units of the curvature radius, the thickness and the focal length are expressed in mm, and HFOV is half of the maximum field of view.

TABLE 9

(Embodiment 4)
f = 5.00 mm, Fno = 2.45, HFOV = 38.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.941270 (ASP) | 0.500 | Plastic | 1.544 | 55.9 | −5.32 |
| 2 | | 1.371400 (ASP) | 2.976 | | | | |
| 3 | Lens 2 | 5.730700 (ASP) | 0.502 | Plastic | 1.544 | 55.9 | 13.74 |
| 4 | | 23.809500 (ASP) | 0.050 | | | | |
| 5 | Ape. Stop | Plano | 0.109 | | | | |
| 6 | Lens 3 | 5.079 | 2.073 | Glass | 1.620 | 60.3 | 4.44 |
| 7 | | −5.079 | 0.550 | | | | |
| 8 | Lens 4 | 20.000000 (ASP) | 0.600 | Plastic | 1.650 | 21.4 | −5.93 |
| 9 | | 3.191700 (ASP) | 0.347 | | | | |
| 10 | Lens 5 | −38.461500 (ASP) | 0.583 | Plastic | 1.544 | 55.9 | 9.38 |
| 11 | | −4.529900 (ASP) | 3.000 | | | | |
| 12 | IR-filter | Plano | 0.300 | Glass | 1.516 | 64.1 | — |
| 13 | | Plano | 2.151 | | | | |
| 14 | Image | Plano | — | | | | |

Reference wavelength is 587.6 nm (d-line)

TABLE 10

Aspheric Coefficients

| Surface # | 1 | 2 | 3 | 4 |
|---|---|---|---|---|
| k = | −4.71822E+00 | −1.55203E+00 | −6.72801E−01 | −8.50842E+01 |
| A4 = | 1.50564E−03 | 2.65024E−02 | −4.66217E−03 | −8.89413E−03 |
| A6 = | 1.46424E−04 | 2.29291E−03 | 2.53702E−03 | 2.32350E−03 |
| A8 = | −5.95934E−05 | 1.35079E−04 | −9.49677E−04 | −8.85654E−04 |
| A10 = | 3.02944E−06 | 3.55351E−05 | 1.66026E−04 | 1.72681E−04 |

| Surface # | 8 | 9 | 10 | 11 |
|---|---|---|---|---|
| k = | −8.72604E+01 | −1.03828E+01 | +1.00000E+00 | −1.88095E+01 |
| A4 = | −4.82135E−02 | −1.89238E−02 | −8.82586E−03 | −1.94206E−02 |
| A6 = | 6.84826E−03 | 1.48434E−03 | 4.69088E−03 | 9.14502E−03 |
| A8 = | −9.04923E−04 | 7.48503E−04 | 4.87148E−04 | −3.55597E−04 |
| A10 = | 8.56167E−05 | −5.45223E−05 | −1.35961E−04 | −8.16617E−05 |
| A12 = | 2.41286E−05 | | | |
| A14 = | −4.28322E−06 | | | |

The equation of the aspheric surface profiles of the fourth embodiment has the same form as that of the first embodiment. Moreover, the definitions of the parameters of the relations are the same as those set forth in the first embodiment, but the value of the relations of the fourth embodiment are listed in the following TABLE 11:

TABLE 11

(Embodiment 4)

| | |
|---|---|
| f | 5.00 |
| Fno | 2.45 |
| HFOV | 38.1 |
| V3-V4 | 38.9 |
| CT5/f | 0.12 |
| CT4/CT3 | 0.29 |
| T23/T12 | 0.05 |
| R1/f | 0.59 |
| R10/f | −0.91 |
| R3/R4 | 0.24 |
| R6/R5 | −1.00 |
| f/f1 | −0.94 |
| f/f2 | 0.36 |
| f/f3-|f/f4| | 0.28 |
| SL/TTL | 0.71 |

Embodiment 5

Figure 5A:
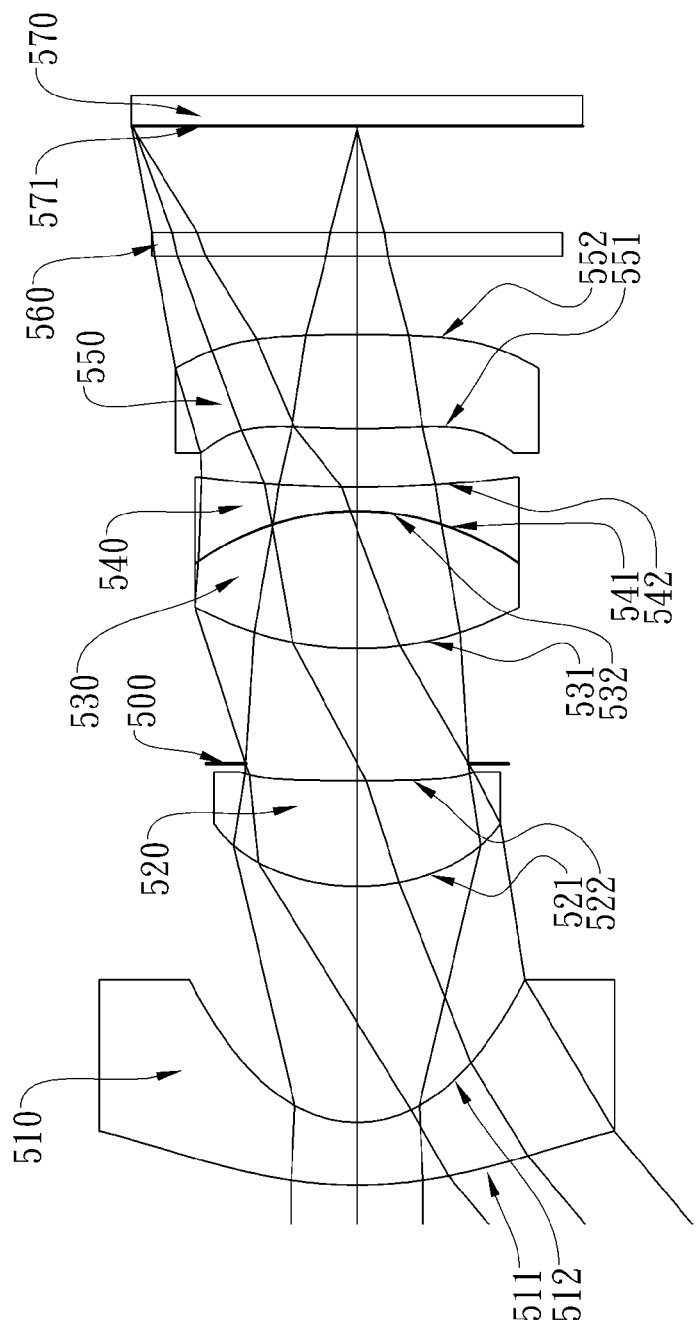
FIG. 5A shows an image-capturing optical lens assembly in accordance with a fifth embodiment of the present invention.
Figure 5B:
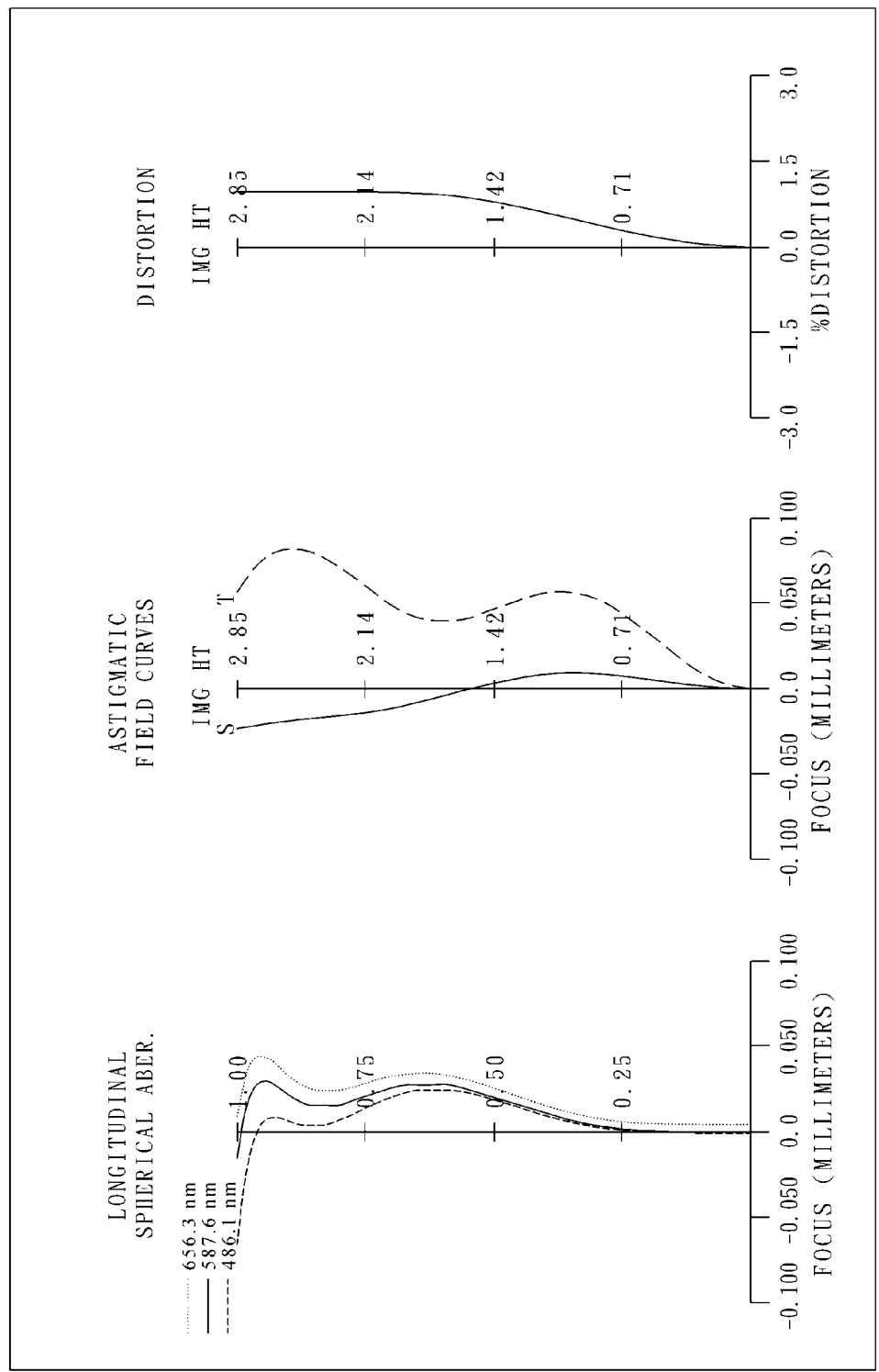
FIG. 5B shows the aberration curves of the fifth embodiment of the present invention.

FIG. 5A shows an image-capturing optical lens assembly in accordance with the fifth embodiment of the present invention, and FIG. 5B shows the aberration curves of the fifth embodiment of the present invention. The image-capturing optical lens assembly in the fifth embodiment mainly comprises five lens elements, in order from an object side to an image side: a front lens group, an aperture stop 500 and a rear lens group, wherein:

the front lens group comprises, in order from the object side to the image side:

a plastic first lens element 510 with negative refractive power having a convex object-side surface 511 and a concave image-side surface 512, both of the surfaces 511 and 512 being aspheric; and a plastic second lens element 520 with positive refractive power having a convex object-side surface 521 and a concave image-side surface 522, both of the surfaces 521 and 522 being aspheric;

the rear lens group comprises, in order from the object side to the image side:

a glass third lens element 530 with positive refractive power having a convex object-side surface 531 and a convex image-side surface 532;

a glass fourth lens element 540 with negative refractive power having a concave object-side surface 541 and a concave image-side surface 542; and a plastic fifth lens element 550 with positive refractive power having a convex object-side surface 551 and a convex image-side surface 552, both of the surfaces 551 and 552 being aspheric.

Moreover, the image-capturing optical lens assembly comprises an IR filter 560 disposed between the image-side surface 552 of the fifth lens element 550 and an image plane 571; the IR filter 560 is made of glass and has no influence on the focal length of the image-capturing optical lens assembly. The image-capturing optical lens assembly further comprises an image sensor 570 provided on the image plane 571.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximum field of view.

TABLE 12

(Embodiment 5)
f = 3.36 mm, Fno = 2.00, HFOV = 40.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 5.553200 (ASP) | 0.800 | Plastic | 1.530 | 55.8 | −4.23 |
| 2 | | 1.518430 (ASP) | 3.007 | | | | |
| 3 | Lens 2 | 2.875220 (ASP) | 1.346 | Plastic | 1.530 | 55.8 | 5.75 |
| 4 | | 42.918500 (ASP) | 0.218 | | | | |
| 5 | Ape. Stop | Plano | 1.466 | | | | |
| 6 | Lens 3 | 4.252 | 1.751 | Glass | 1.755 | 52.3 | 2.82 |
| 7 | | −3.509 | 0.010 | Cement | 1.514 | 38.8 | |
| 8 | Lens 4 | −3.509 | 0.300 | Glass | 1.847 | 23.8 | −3.37 |
| 9 | | 15.846 | 0.744 | | | | |
| 10 | Lens 5 | 9.260100 (ASP) | 1.200 | Plastic | 1.530 | 55.8 | 13.14 |
| 11 | | −26.816800 (ASP) | 1.000 | | | | |
| 12 | IR-filter | Plano | 0.300 | Glass | 1.516 | 64.1 | — |
| 13 | | Plano | 1.363 | | | | |
| 14 | Image | Plano | — | | | | |

Reference wavelength is 587.6 nm (d-line)

TABLE 13

Aspheric Coefficients

| Surface # | 1 | 2 | 3 |
|---|---|---|---|
| k = | 7.59131E−01 | −1.06188E+00 | 1.02585E+00 |
| A4 = | −3.64147E−03 | 1.72315E−02 | −2.45784E−03 |
| A6 = | −6.26993E−05 | −5.42813E−04 | 9.49002E−04 |
| A8 = | 1.82703E−06 | 4.71397E−04 | −3.45011E−04 |
| A10 = | −2.49451E−07 | −8.03152E−05 | 6.80114E−05 |

| Surface # | 4 | 10 | 11 |
|---|---|---|---|
| k = | −1.00000E+00 | −9.89213E+00 | −1.00000E+00 |
| A4 = | 5.62837E−03 | −2.63212E−02 | −8.95045E−03 |
| A6 = | 6.40150E−03 | 2.20131E−03 | −8.75349E−04 |
| A8 = | −2.92462E−03 | −2.15527E−03 | −1.08664E−04 |
| A10 = | 1.16018E−03 | 3.08103E−04 | 3.49265E−05 |

The equation of the aspheric surface profiles of the fifth embodiment has the same form as that of the first embodiment. Moreover, the definitions of the parameters of the relations are the same as those set forth in the first embodiment, but the value of the relations of the fifth embodiment are listed in the following TABLE 14:

TABLE 14

(Embodiment 5)

| | |
|---|---|
| f | 3.36 |
| Fno | 2.00 |
| HFOV | 40.0 |
| V3-V4 | 28.5 |
| CT5/f | 0.36 |
| CT4/CT3 | 0.17 |
| T23/T12 | 0.56 |
| R1/f | 1.65 |
| R10/f | −7.98 |
| R3/R4 | 0.07 |
| R6/R5 | −0.83 |
| f/f1 | −0.79 |
| f/f2 | 0.58 |
| f/f3-|f/f4| | 0.19 |
| SL/TTL | 0.60 |

Embodiment 6

Figure 6A:
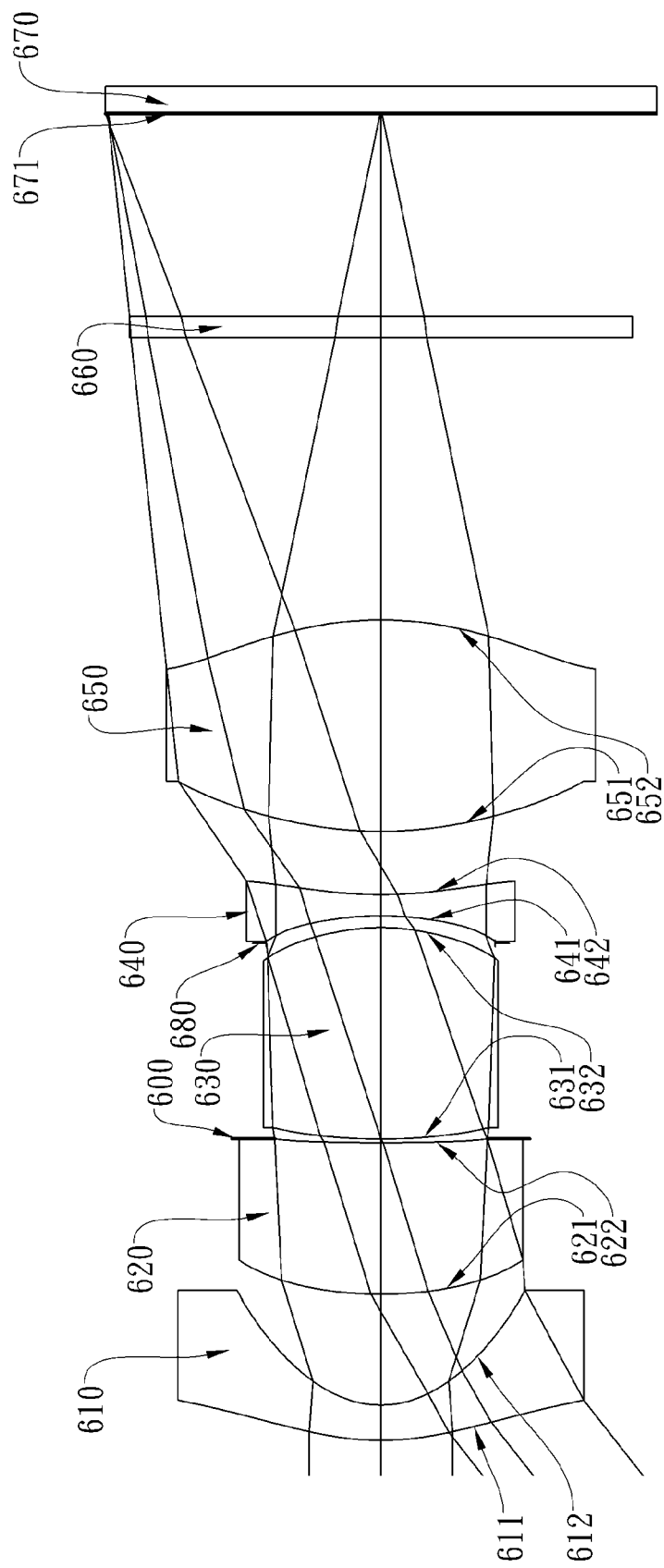
FIG. 6A shows an image-capturing optical lens assembly in accordance with a sixth embodiment of the present invention.
Figure 6B:
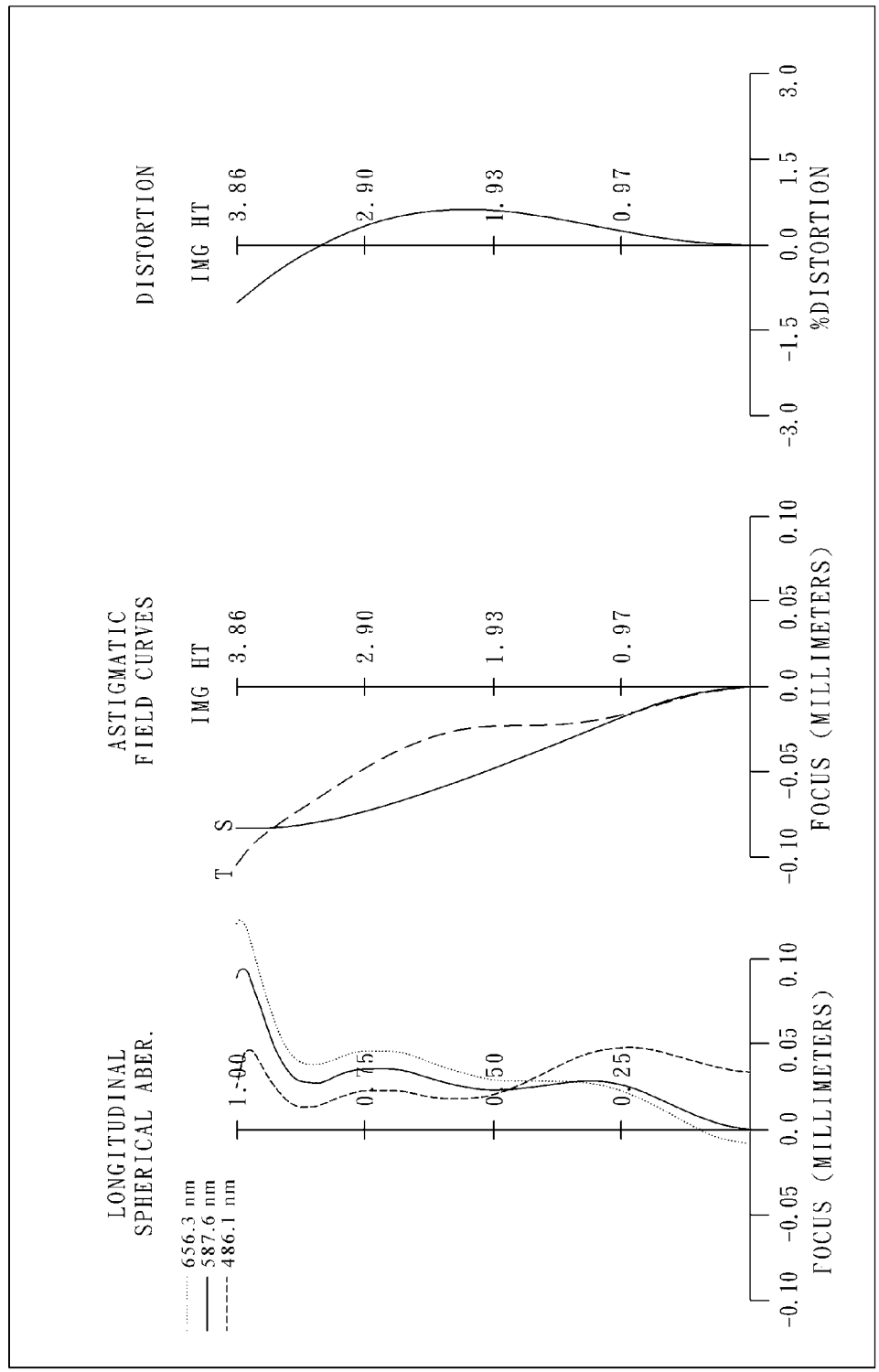
FIG. 6B shows the aberration curves of the sixth embodiment of the present invention.

FIG. 6A shows an image-capturing optical lens assembly in accordance with the sixth embodiment of the present invention, and FIG. 6B shows the aberration curves of the sixth embodiment of the present invention. The image-capturing optical lens assembly in the sixth embodiment mainly comprises five lens elements, in order from an object side to an image side: a front lens group, an aperture stop 600 and a rear lens group, wherein:

the front lens group comprises, in order from the object side to the image side:

a plastic first lens element 610 with negative refractive power having a convex object-side surface 611 and a concave image-side surface 612, both of the surfaces 611 and 612 being aspheric; and a plastic second lens element 620 with positive refractive power having a convex object-side surface 621 and a concave image-side surface 622, both of the surfaces 621 and 622 being aspheric;

the rear lens group comprises, in order from the object side to the image side:

a plastic third lens element 630 with positive refractive power having a convex object-side surface 631 and a convex image-side surface 632, both of the surfaces 631 and 632 being aspheric;

a plastic fourth lens element 640 with negative refractive power having a concave object-side surface 641 and a concave image-side surface 642, both of the surfaces 641 and 642 being aspheric; and a plastic fifth lens element 650 with positive refractive power having a convex object-side surface 651 and a convex image-side surface 652, both of the surfaces 651 and 652 being aspheric.

Moreover, the image-capturing optical lens assembly comprises an IR filter 660 disposed between the image-side surface 652 of the fifth lens element 650 and an image plane 671; the IR filter 660 is made of glass and has no influence on the focal length of the image-capturing optical lens assembly. The image-capturing optical lens assembly further comprises an image sensor 670 provided on the image plane 671, and a stop 680 disposed between the image-side surface 632 of the third lens element 630 and the object-side surface 641 of the fourth lens element 640.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximum field of view.

TABLE 15

(Embodiment 6)
f = 4.98 mm, Fno = 2.45, HFOV = 38.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.763700 (ASP) | 0.500 | Plastic | 1.544 | 55.9 | −4.29 |
| 2 | | 1.373780 (ASP) | 1.566 | | | | |
| 3 | Lens 2 | 5.669800 (ASP) | 2.147 | Plastic | 1.634 | 23.8 | 11.19 |
| 4 | | 24.070700 (ASP) | 0.056 | | | | |
| 5 | Ape. Stop | Plano | −0.005 | | | | |
| 6 | Lens 3 | 6.633900 (ASP) | 3.000 | Plastic | 1.535 | 56.3 | 4.35 |
| 7 | | −3.018700 (ASP) | −0.221 | | | | |
| 8 | Stop | Plano | 0.389 | | | | |
| 9 | Lens 4 | −4.271700 (ASP) | 0.300 | Plastic | 1.634 | 23.8 | −3.87 |
| 10 | | 5.926700 (ASP) | 0.897 | | | | |
| 11 | Lens 5 | 5.343900 (ASP) | 3.000 | Plastic | 1.544 | 55.9 | 5.23 |
| 12 | | −4.885600 (ASP) | 4.000 | | | | |
| 13 | IR-filter | Plano | 0.300 | Glass | 1.516 | 64.1 | — |
| 14 | | Plano | 2.883 | | | | |
| 15 | Image | Plano | — | | | | |

Reference wavelength is 587.6 nm (d-line)
Effective radius of Surface 8 is 1.62 mm

TABLE 16

Aspheric Coefficients

| Surface # | 1 | 2 | 3 | 4 | 6 |
|---|---|---|---|---|---|
| k = | −2.90436E+00 | −7.66130E−01 | 4.49265E+00 | −9.90000E+01 | −7.75270E+01 |
| A4 = | −8.56799E−03 | −6.66963E−03 | 2.23519E−03 | −1.15946E−02 | 1.08558E−02 |
| A6 = | 5.95461E−04 | −8.55977E−04 | −5.19384E−04 | 7.63468E−03 | −4.77192E−03 |
| A8 = | −1.62992E−05 | −1.38695E−04 | 1.75617E−04 | 3.11703E−04 | 4.68839E−03 |
| A10 = | | 4.44199E−05 | −2.05434E−05 | −4.32637E−04 | −1.20613E−03 |
| A12 = | | −1.88126E−07 | | −2.37429E−13 | −2.48709E−13 |

| Surface # | 7 | 9 | 10 | 11 | 12 |
|---|---|---|---|---|---|
| k = | −5.71612E+00 | −1.34646E+01 | −3.02246E+01 | −1.15361E+01 | −2.75210E+00 |
| A4 = | 5.89052E−03 | 5.79392E−03 | 1.01880E−02 | 2.98746E−03 | −6.06500E−04 |
| A6 = | −1.12077E−02 | −1.34059E−02 | −6.78877E−03 | −9.32537E−05 | 1.26566E−04 |
| A8 = | 1.68886E−03 | 2.04713E−03 | 1.67814E−03 | 1.30239E−05 | 4.27289E−06 |
| A10 = | −1.09054E−04 | −2.12238E−04 | −2.29803E−04 | −3.38353E−07 | 7.35260E−07 |
| A12 = | −1.15310E−06 | −8.32775E−13 | 1.32290E−05 | | |

The equation of the aspheric surface profiles of the sixth embodiment has the same form as that of the first embodiment. Moreover, the definitions of the parameters of the relations are the same as those set forth in the first embodiment, but the value of the relations of the sixth embodiment are listed in the following TABLE 17:

TABLE 17

(Embodiment 6)

| | |
|---|---|
| f | 4.98 |
| Fno | 2.45 |
| HFOV | 38.1 |
| V3-V4 | 32.5 |
| CT5/f | 0.60 |
| CT4/CT3 | 0.10 |
| T23/T12 | 0.03 |
| R1/f | 0.76 |
| R10/f | −0.98 |
| R3/R4 | 0.24 |
| R6/R5 | −0.46 |
| f/f1 | −1.16 |
| f/f2 | 0.45 |
| f/f3−|f/f4| | −0.14 |
| SL/TTL | 0.77 |

Embodiment 7

Figure 7A:
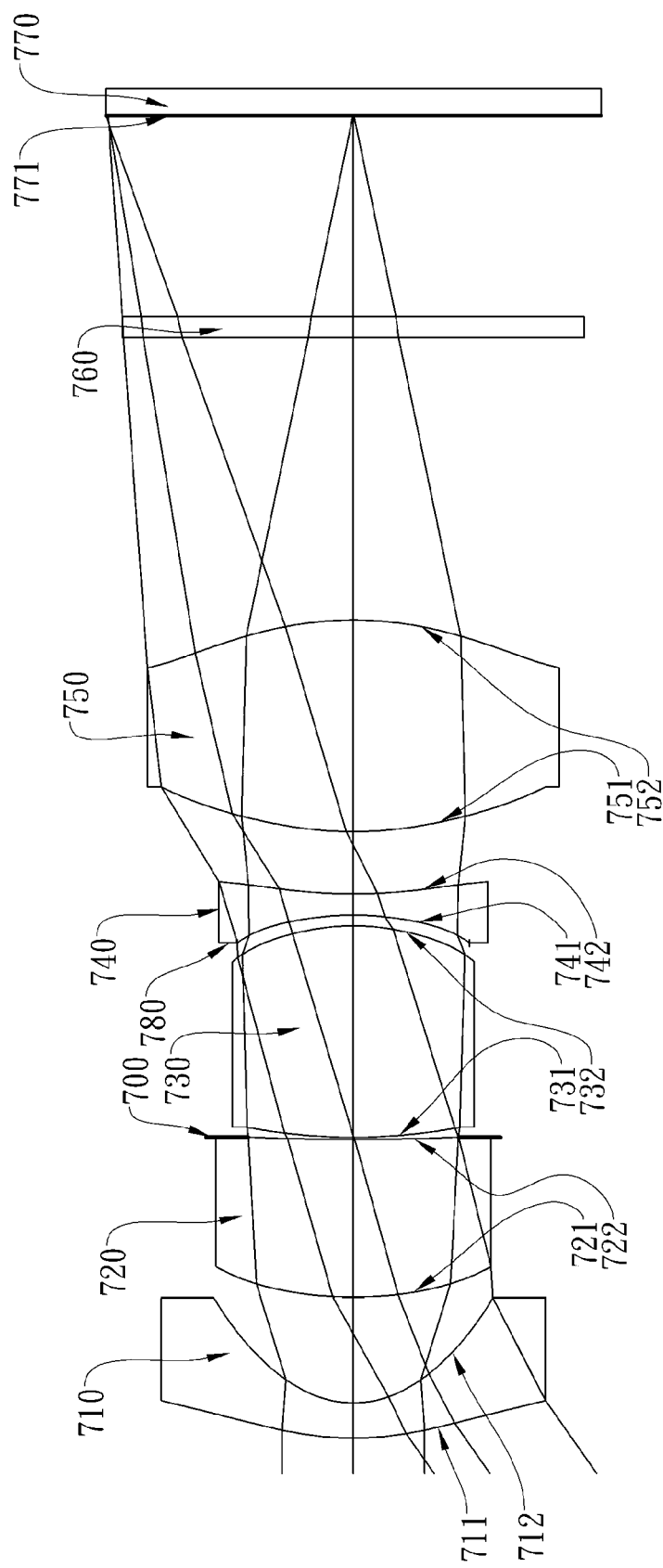
FIG. 7A shows an image-capturing optical lens assembly in accordance with a seventh embodiment of the present invention.
Figure 7B:
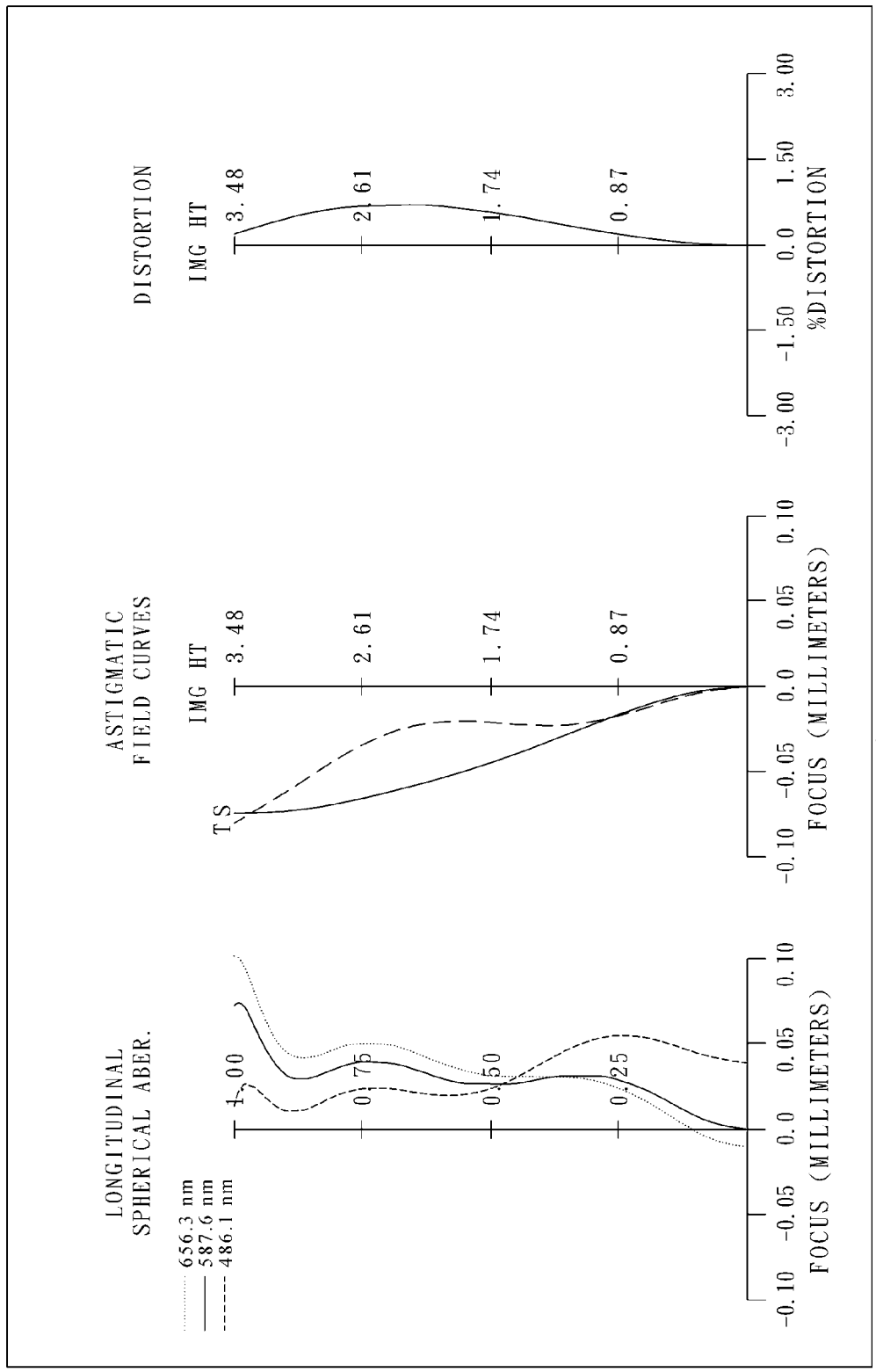
FIG. 7B shows the aberration curves of the seventh embodiment of the present invention.

FIG. 7A shows an image-capturing optical lens assembly in accordance with the seventh embodiment of the present invention, and FIG. 7B shows the aberration curves of the seventh embodiment of the present invention. The image-capturing optical lens assembly in the seventh embodiment mainly comprises five lens elements, in order from an object side to an image side: a front lens group, an aperture stop 700 and a rear lens group, wherein:

the front lens group comprises, in order from the object side to the image side:

a plastic first lens element 710 with negative refractive power having a convex object-side surface 711 and a concave image-side surface 712, both of the surfaces 711 and 712 being aspheric; and a plastic second lens element 720 with positive refractive power having a convex object-side surface 721 and a concave image-side surface 722, both of the surfaces 721 and 722 being aspheric;

the rear lens group comprises, in order from the object side to the image side:

a plastic third lens element 730 with positive refractive power having a convex object-side surface 731 and a convex image-side surface 732, both of the surfaces 731 and 732 being aspheric;

a plastic fourth lens element 740 with negative refractive power having a concave object-side surface 741 and a concave image-side surface 742, both of the surfaces 741 and 742 being aspheric; and a plastic fifth lens element 750 with positive refractive power having a convex object-side surface 751 and a convex image-side surface 752, both of the surfaces 751 and 752 being aspheric.

Moreover, the image-capturing optical lens assembly comprises an IR filter 760 disposed between the image-side surface 752 of the fifth lens element 750 and an image plane 771; the IR filter 760 is made of glass and has no influence on the focal length of the image-capturing optical lens assembly. The image-capturing optical lens assembly further comprises an image sensor 770 provided on the image plane 771, and a stop 780 disposed between the image-side surface 732 of the third lens element 730 and the object-side surface 741 of the fourth lens element 740.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximum field of view.

TABLE 18

(Embodiment 7)
f = 4.94 mm, Fno = 2.45, HFOV = 35.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.989100 (ASP) | 0.500 | Plastic | 1.544 | 55.9 | −4.26 |
| 2 | | 1.402230 (ASP) | 1.494 | | | | |
| 3 | Lens 2 | 5.616000 (ASP) | 2.230 | Plastic | 1.634 | 23.8 | 11.04 |
| 4 | | 24.079200 (ASP) | 0.035 | | | | |
| 5 | Ape. Stop | Plano | −0.005 | | | | |
| 6 | Lens 3 | 6.530300 (ASP) | 3.000 | Plastic | 1.535 | 56.3 | 4.32 |
| 7 | | −2.998530 (ASP) | −0.245 | | | | |
| 8 | Stop | Plano | 0.397 | | | | |
| 9 | Lens 4 | −3.815800 (ASP) | 0.300 | Plastic | 1.634 | 23.8 | −3.77 |
| 10 | | 6.579600 (ASP) | 0.882 | | | | |
| 11 | Lens 5 | 5.010600 (ASP) | 3.000 | Plastic | 1.544 | 55.9 | 5.10 |
| 12 | | −4.900100 (ASP) | 4.000 | | | | |
| 13 | IR-filter | Plano | 0.300 | Glass | 1.516 | 64.1 | — |
| 14 | | Plano | 2.849 | | | | |
| 15 | Image | Plano | — | | | | |

Reference wavelength is 587.6 nm (d-line)
Effective radius of Surface 8 is 1.645 mm

TABLE 19

Aspheric Coefficients

| Surface # | 1 | 2 | 3 | 4 | 6 |
|---|---|---|---|---|---|
| k = | −2.81699E+00 | −7.99108E−01 | 4.02921E+00 | 4.22417E+01 | −7.94408E+01 |
| A4 = | −8.38848E−03 | −3.98687E−03 | 2.11172E−03 | −1.57199E−02 | 9.74631E−03 |

TABLE 19-continued

| Aspheric Coefficients | | | | | |
|---|---|---|---|---|---|
| A6 = | 6.50289E−04 | −6.98718E−04 | −6.40156E−04 | 8.50150E−03 | −5.18712E−03 |
| A8 = | −1.95971E−05 | −1.01062E−04 | 1.54584E−04 | −2.17998E−04 | 4.76370E−03 |
| A10 = | | 5.42089E−05 | −1.62189E−05 | −4.37722E−04 | −1.31052E−03 |
| A12 = | | −1.88383E−07 | | −2.37402E−13 | −2.49024E−13 |

| Surface # | 7 | 9 | 10 | 11 | 12 |
|---|---|---|---|---|---|
| k = | −7.25028E+00 | −1.13850E+01 | −4.67010E+01 | −1.17351E+01 | −3.13327E+00 |
| A4 = | 3.54863E−03 | 7.77099E−03 | 1.04391E−02 | 2.57142E−03 | −1.03347E−03 |
| A6 = | −1.07124E−02 | −1.35244E−02 | −6.40507E−03 | −5.98586E−05 | 1.64829E−04 |
| A8 = | 1.42456E−03 | 1.92033E−03 | 1.61191E−03 | 1.35890E−05 | 2.14296E−07 |
| A10 = | −6.58582E−05 | −1.67746E−04 | −2.25502E−04 | −4.31544E−07 | 9.49148E−07 |
| A12 = | −1.15310E−06 | −8.52800E−13 | 1.32289E−05 | | |

The equation of the aspheric surface profiles of the seventh embodiment has the same form as that of the first embodiment. Moreover, the definitions of the parameters of the relations are the same as those set forth in the first embodiment, but the value of the relations of the seventh embodiment are listed in the following TABLE 20:

TABLE 20

(Embodiment 7)

| | |
|---|---|
| f | 4.94 |
| Fno | 2.45 |
| HFOV | 35.1 |
| V3−V4 | 32.5 |
| CT5/f | 0.61 |
| CT4/CT3 | 0.10 |
| T23/T12 | 0.02 |
| R1/f | 0.81 |
| R10/f | −0.99 |
| R3/R4 | 0.23 |
| R6/R5 | −0.46 |
| f/f1 | −1.16 |
| f/f2 | 0.45 |
| f/f3−|f/f4| | −0.17 |
| SL/TTL | 0.77 |

Embodiment 8

Figure 8A:
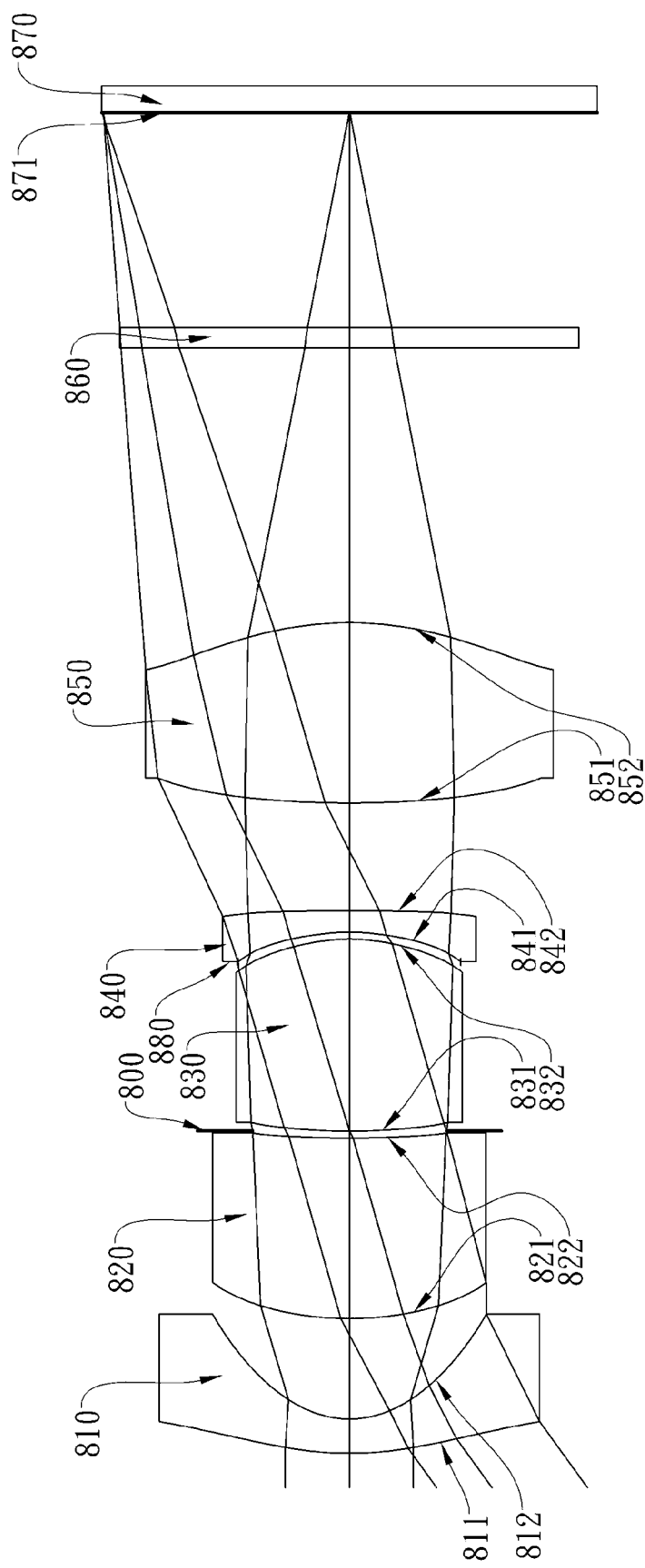
FIG. 8A shows an image-capturing optical lens assembly in accordance with an eighth embodiment of the present invention.
Figure 8B:
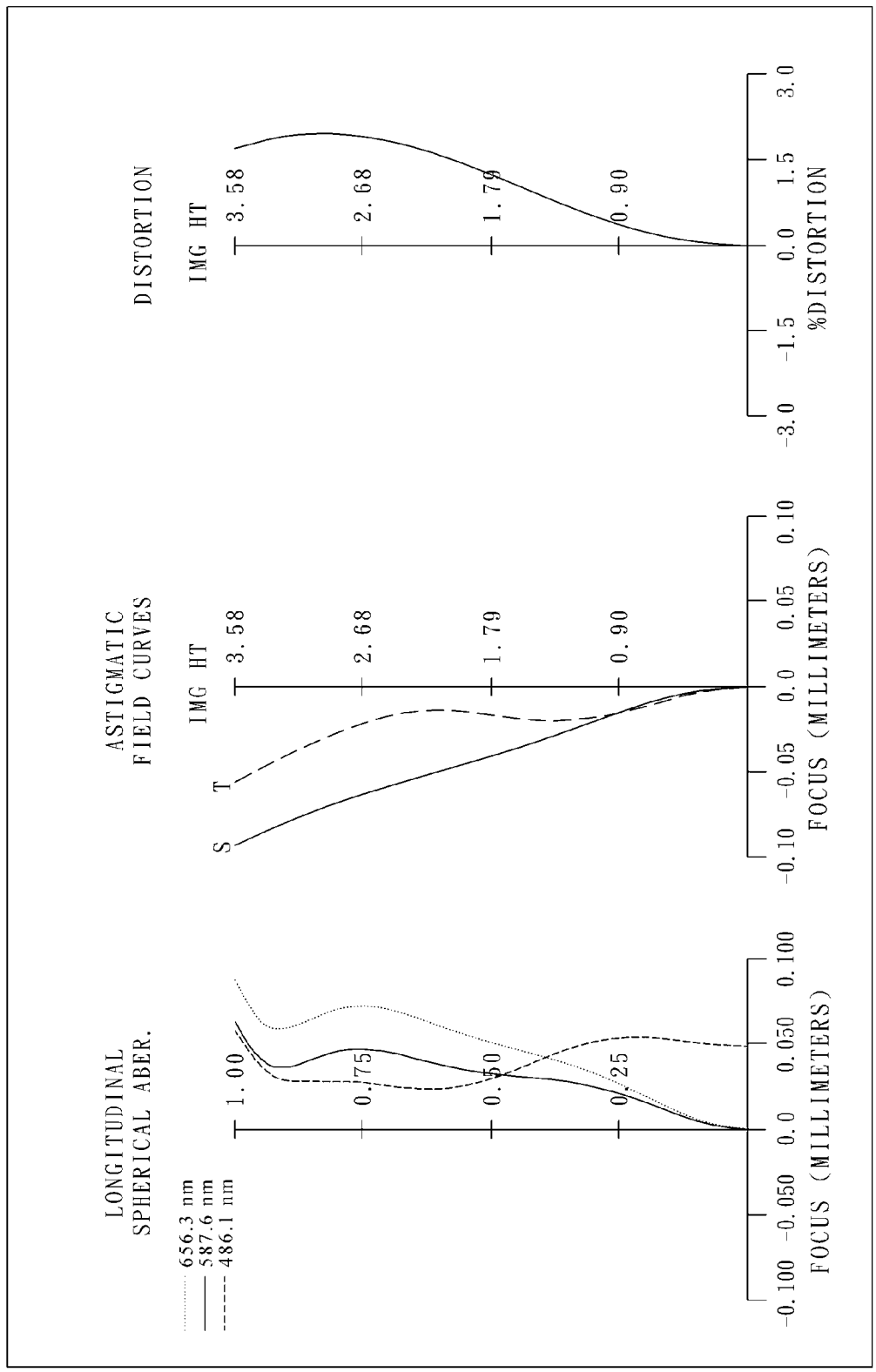
FIG. 8B shows the aberration curves of the eighth embodiment of the present invention.

FIG. 8A shows an image-capturing optical lens assembly in accordance with the eighth embodiment of the present invention, and FIG. 8B shows the aberration curves of the eighth embodiment of the present invention. The image-capturing optical lens assembly in the eighth embodiment mainly comprises five lens elements, in order from an object side to an image side: a front lens group, an aperture stop 800 and a rear lens group, wherein:

the front lens group comprises, in order from the object side to the image side:

a plastic first lens element 810 with negative refractive power having a convex object-side surface 811 and a concave image-side surface 812, both of the surfaces 811 and 812 being aspheric; and a plastic second lens element 820 with positive refractive power having a convex object-side surface 821 and a concave image-side surface 822, both of the surfaces 821 and 822 being aspheric;

the rear lens group comprises, in order from the object side to the image side:

a plastic third lens element 830 with positive refractive power having a convex object-side surface 831 and a convex image-side surface 832, both of the surfaces 831 and 832 being aspheric;

a plastic fourth lens element 840 with negative refractive power having a concave object-side surface 841 and a convex image-side surface 842, both of the surfaces 841 and 842 being aspheric; and a plastic fifth lens element 850 with positive refractive power having a convex object-side surface 851 and a convex image-side surface 852, both of the surfaces 851 and 852 being aspheric.

Moreover, the image-capturing optical lens assembly comprises an IR filter 860 disposed between the image-side surface 852 of the fifth lens element 850 and an image plane 871; the IR filter 860 is made of glass and has no influence on the focal length of the image-capturing optical lens assembly. The image-capturing optical lens assembly further comprises an image sensor 870 provided on the image plane 871, and a stop 880 disposed between the image-side surface 832 of the third lens element 830 and the object-side surface 841 of the fourth lens element 840.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximum field of view.

TABLE 21

(Embodiment 8)
f = 4.86 mm, Fno = 2.61, HFOV = 35.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.708600 (ASP) | 0.500 | Plastic | 1.544 | 55.9 | −3.94 |
| 2 | | 1.417880 (ASP) | 1.462 | | | | |
| 3 | Lens 2 | 4.701600 (ASP) | 2.620 | Plastic | 1.634 | 23.8 | 11.02 |
| 4 | | 11.261600 (ASP) | 0.106 | | | | |
| 5 | Ape. Stop | Plano | −0.005 | | | | |
| 6 | Lens 3 | 7.108400 (ASP) | 2.800 | Plastic | 1.535 | 56.3 | 4.06 |

TABLE 21-continued (Embodiment 8)
f = 4.86 mm, Fno = 2.61, HFOV = 35.9 deg.

| Surface # | | Curvature Radius | Thickness | Material | Index | Abbe # | Focal length |
|---|---|---|---|---|---|---|---|
| 7 | | −2.694900 (ASP) | −0.331 | | | | |
| 8 | Stop | Plano | 0.431 | | | | |
| 9 | Lens 4 | −3.168700 (ASP) | 0.311 | Plastic | 1.650 | 21.4 | −5.41 |
| 10 | | −33.333300 (ASP) | 1.571 | | | | |
| 11 | Lens 5 | 14.330900 (ASP) | 2.628 | Plastic | 1.544 | 55.9 | 7.04 |
| 12 | | −4.894900 (ASP) | 4.000 | | | | |
| 13 | IR-filter | Plano | 0.300 | Glass | 1.516 | 64.1 | — |
| 14 | | Plano | 3.132 | | | | |
| 15 | Image | Plano | — | | | | |

Reference wavelength is 587.6 nm (d-line)
Effective radius of Surface 8 is 1.62 mm

TABLE 22

Aspheric Coefficients

| Surface # | 1 | 2 | 3 | 4 | 6 |
|---|---|---|---|---|---|
| k = | −1.44609E+00 | −7.98147E−01 | 2.56920E+00 | −1.37213E+01 | −8.39368E+01 |
| A4 = | −8.28025E−03 | −7.46351E−04 | −5.04799E−04 | −1.63217E−02 | 4.89906E−03 |
| A6 = | 4.52513E−04 | −1.33111E−03 | −4.36487E−04 | 4.34370E−03 | −6.17631E−03 |
| A8 = | −1.17873E−05 | 9.57534E−05 | 1.88280E−04 | 3.33208E−03 | 7.36202E−03 |
| A10 = | | 2.42391E−05 | −2.01837E−05 | −9.92868E−04 | −1.71591E−03 |
| A12 = | | −1.32131E−07 | | −2.24496E−11 | −2.24698E−11 |

| Surface # | 7 | 9 | 10 | 11 | 12 |
|---|---|---|---|---|---|
| k = | −5.24268E+00 | −9.39193E+00 | −9.84590E+01 | −4.03579E+01 | −2.80514E+00 |
| A4 = | 9.00700E−03 | 8.56411E−03 | 8.76857E−03 | 1.84151E−03 | −4.39996E−04 |
| A6 = | −1.06589E−02 | −1.39125E−02 | −7.41694E−03 | −2.00081E−05 | 1.41960E−04 |
| A8 = | 1.04105E−03 | 1.77615E−03 | 1.77298E−03 | 2.07772E−05 | −2.79232E−06 |
| A10 = | −6.59139E−05 | −2.11608E−04 | −2.23783E−04 | −7.94085E−07 | 1.06458E−06 |
| A12 = | −1.15313E−06 | −2.31930E−11 | 1.31740E−05 | | |

The equation of the aspheric surface profiles of the eighth embodiment has the same form as that of the first embodiment. Moreover, the definitions of the parameters of the relations are the same as those set forth in the first embodiment, but the value of the relations of the eighth embodiment are listed in the following TABLE 23:

TABLE 23

(Embodiment 8)

| | |
|---|---|
| f | 4.86 |
| Fno | 2.61 |
| HFOV | 35.9 |
| V3-V4 | 34.9 |
| CT5/f | 0.54 |
| CT4/CT3 | 0.11 |
| T23/T12 | 0.07 |
| R1/f | 0.97 |
| R10/f | −1.01 |
| R3/R4 | 0.42 |
| R6/R5 | −0.38 |
| f/f1 | −1.23 |
| f/f2 | 0.44 |
| f/f3−|f/f4| | 0.30 |
| SL/TTL | 0.76 |

It is to be noted that TABLES 1-23 show different data of the different embodiments; however, the data of the different embodiments are obtained from experiments. Therefore, any image-capturing optical lens assembly of the same structure is considered to be within the scope of the present invention even if it uses different data. The preferred embodiments depicted above are exemplary and are not intended to limit the scope of the present invention.

What is claimed is:

1. An image-capturing optical lens assembly comprising, in order from an object side to an image side, a front lens group, a stop, and a rear lens group, wherein
the front lens group comprises, in order from the object side to the image side:
a first lens element with negative refractive power having a convex object-side surface and a concave image-side surface;
a second lens element with positive refractive power having a convex object-side surface and a concave image-side surface; and
the rear lens group comprises, in order from the object side to the image side:
a third lens element with positive refractive power having a convex object-side surface and a convex image-side surface;
a fourth lens element with negative refractive power;
a fifth lens element with positive refractive power having a convex image-side surface, and
wherein a central thickness of the fifth lens element is CT5, a focal length of the lens assembly is f, a curvature radius of the object-side surface of the first lens element is R1, a curvature radius of the image-side surface of the fifth lens element is R10, and they satisfy the following relations:

$0 < CT5/f < 0.7;$ $0 < R1/f < 5.5;$ and $R10/f < -0.85.$

2. The image-capturing optical lens assembly according to claim 1, wherein the fifth lens element is made of plastic and at least one of the object-side and image-side surfaces of the fifth lens element is aspheric.

3. The image-capturing optical lens assembly according to claim 2, wherein an axial distance between the first lens element and the second lens element is T12, an axial distance between the second lens element and the third lens element is T23, and they satisfy the following relation:

$$0<T23/T12<0.65.$$

4. The image-capturing optical lens assembly according to claim 3, wherein the focal length of the lens assembly is f, a focal length of the first lens element is f1, and they satisfy the following relation:

$$-1.6<f/f1<-0.6.$$

5. The image-capturing optical lens assembly according to claim 4, wherein the first lens element, the second lens element, the third lens element, the fourth lens element, and the fifth lens element have refractive power.

6. The image-capturing optical lens assembly according to claim 5, wherein an axial distance between the stop and an image plane is SL, an axial distance between the object-side surface of the first lens element and the image plane is TTL, and they satisfy the following relation:

$$0.55<SL/TTL<0.85.$$

7. The image-capturing optical lens assembly according to claim 5, wherein an Abbe number of the third lens element is V3, an Abbe number of the fourth lens element is V4, and they satisfy the following relation:

$$28<V3-V4<45.$$

8. The image-capturing optical lens assembly according to claim 5, wherein the focal length of the lens assembly is f, a focal length of the second lens element is f2, and they satisfy the following relation:

$$0.2<f/f2<0.8.$$

9. The image-capturing optical lens assembly according to claim 5, wherein a curvature radius of the object-side surface of the second lens element is R3, a curvature radius of the image-side surface of the second lens element is R4, and they satisfy the following relation:

$$0<R3/R4<0.5.$$

10. The image-capturing optical lens assembly according to claim 9, wherein the curvature radius of the object-side surface of the third lens element is R5, a curvature radius of the image-side surface of the third lens element is R6, and they satisfy the following relation:

$$-2.0<R6/R5<-0.2.$$

11. The image-capturing optical lens assembly according to claim 9, wherein the focal length of the lens assembly is f, a focal length of the third lens element is f3, a focal length of the fourth lens element is f4, and they satisfy the following relation:

$$0<f/f3-|f/f4|<0.5.$$

12. The image-capturing optical lens assembly according to claim 5, wherein the third lens element is made of glass.

13. The image-capturing optical lens assembly according to claim 2, wherein an axial distance between the first lens element and the second lens element is T12, an axial distance between the second lens element and the third lens element is T23, and they satisfy the following relation:

$$0<T23/T12<0.2.$$

14. The image-capturing optical lens assembly according to claim 3, wherein the focal length of the lens assembly is f, a focal length of the second lens element is f2, and they satisfy the following relation:

$$0.35<f/f2<0.7.$$

15. The image-capturing optical lens assembly according to claim 3, wherein the fourth lens element has a convex object-side surface and a concave image-side surface.

16. The image-capturing optical lens assembly according to claim 4, wherein half of the maximum field of view of the lens assembly is HFOV, and it satisfies the following relation:

$$35 \text{ degrees}<HFOV<45 \text{ degrees}.$$

17. The image-capturing optical lens assembly according to claim 4, wherein a central thickness of the third lens element is CT3, a central thickness of the fourth lens element is CT4, and they satisfy the following relation:

$$0<CT4/CT3<0.3.$$

18. The image-capturing optical lens assembly according to claim 4, wherein the focal length of the lens assembly is f, the focal length of the first lens element is f1, and they satisfy the following relation:

$$-1.3<f/f1<-0.9.$$

* * * * *

UNITED STATES PATENT AND TRADEMARK OFFICE
CERTIFICATE OF CORRECTION

PATENT NO. : 8,345,358 B2  
APPLICATION NO. : 13/194187  
DATED : January 1, 2013  
INVENTOR(S) : Chih-Wen Hsu, Ming-Ta Chou and Tsung-Han Tsai Page 1 of 1

It is certified that error appears in the above-identified patent and that said Letters Patent is hereby corrected as shown below:

Title page, Item 73, line 6: "Largen" should read --Largan--.

Signed and Sealed this
Eighteenth Day of June, 2013

Teresa Stanek Rea
*Acting Director of the United States Patent and Trademark Office*